United States Patent [19]
Ohara et al.

[11] Patent Number: 5,694,588
[45] Date of Patent: Dec. 2, 1997

[54] APPARATUS AND METHOD FOR SYNCHRONIZING DATA TRANSFERS IN A SINGLE INSTRUCTION MULTIPLE DATA PROCESSOR

[75] Inventors: Kazuhiro Ohara, Chiba; Hiroshi Miyaguchi, Tokyo, both of Japan

[73] Assignee: Texas Instruments Incorporated, Dallas, Tex.

[21] Appl. No.: 403,541

[22] Filed: Mar. 14, 1995

Related U.S. Application Data

[63] Continuation of Ser. No. 88,565, Jul. 7, 1993, abandoned, which is a continuation-in-part of Ser. No. 59,165, May 7, 1993, abandoned.

[51] Int. Cl.$^6$ ................................................ G06F 13/00
[52] U.S. Cl. ........................ 395/566; 364/260.2; 364/941
[58] Field of Search ............................... 395/775, 800, 395/566, 733, 551, 821

[56] References Cited

U.S. PATENT DOCUMENTS

| | | | |
|---|---|---|---|
| 3,639,689 | 2/1972 | Doi | 178/6.6 TC |
| 3,676,583 | 7/1972 | Morita et al. | 178/6.6 TC |
| 3,789,365 | 1/1974 | Jen et al. | |
| 3,789,379 | 1/1974 | Breikss | 340/174.1 H |
| 3,795,872 | 3/1974 | Napolitano et al. | 331/49 |
| 3,831,189 | 8/1974 | Shenk et al. | 360/8 |
| 3,851,335 | 11/1974 | Elliott | 360/26 |
| 3,909,843 | 9/1975 | Wray | 360/27 |
| 3,959,815 | 5/1976 | Rotter et al. | 360/36 |
| 3,978,519 | 8/1976 | Stalley et al. | 358/8 |
| 3,992,580 | 11/1976 | Bittel et al. | 178/69.5 |
| 4,040,027 | 8/1977 | van Es et al. | 364/900 |
| 4,054,921 | 10/1977 | Tatami | 360/27 |
| 4,085,448 | 4/1978 | Kogge | |
| 4,181,975 | 1/1980 | Jenkins | 395/550 |
| 4,264,954 | 4/1981 | Briggs | |
| 4,270,183 | 5/1981 | Robinson et al. | 395/250 |
| 4,534,044 | 8/1985 | Funke et al. | 375/120 |
| 4,539,531 | 9/1985 | Thomas et al. | 331/11 |
| 4,716,575 | 12/1987 | Douros et al. | 375/3 |
| 4,718,074 | 1/1988 | Mannas et al. | 375/118 |
| 4,805,197 | 2/1989 | Van Der Jagt et al. | 375/110 |
| 4,839,604 | 6/1989 | Tanahashi | 328/62 |
| 4,941,156 | 7/1990 | Stern et al. | 375/118 |
| 5,091,783 | 2/1992 | Miyaguchi | 348/24 |
| 5,210,836 | 5/1993 | Childers et al. | 395/375 |
| 5,241,660 | 8/1993 | Michael et al. | 395/250 |

OTHER PUBLICATIONS

"Jitter Attenuation Phase Locked Loop Using Switched Capacitor Controlled Crystal Oscillator" by Cheng–Chung Shih and Sam Yinshang Sun; *IEEE 1988 Cusotm Integrated Circuits Conference*, pp. 9.5.1–9.5.2.

"A Monolithic Line Interface Ciruit for T1 Terminals" by Kenneth J. Stern, Nav S. Sooch, David J. Knapp and Michael A. Nix; *1987 IEEE International Solid–State Circuits Conference*, pp.292, 293, 432.

*Primary Examiner*—David Y. Eng
*Attorney, Agent, or Firm*—Gerald E. Laws; C. Alan McClure; Richard L. Donaldson

[57] ABSTRACT

A synchronous vector processor (SVP) device (102) has a plurality of processing elements (150) which are comprised of an RF1 register (166), an ALU (164) and an RF0 (158). The processing elements are operable to be disposed between the data input register DIR (154) and the data output register (DOR) (168) to process data therebetween. Data is received in DIR (154), transferred to the processing elements (150), processed and then output to the DOR (168). A fast response clock operates the DIR (154) such that the jitter on the input signal is tracked. The Read clock on the DOR (168) is a stable clock. Data transferred between the DIR (154) and the DOR (168) is buffered in an elastic buffer to provide a time based compensation (TBC). To facilitate this, a buffer is implemented in either the RF1 (168) or the RF0 (158). A dual global rotation pointer is provided to generate two pointers that are asynchronous. The first pointer allows data to be transferred to the buffered area from/to the ALU (164) and the second pointer allows data to be transferred to the DOR (168) from the RF0 (158) or from a DIR (154) to the RF1 (166). A hardware interrupt is provided to perform this asynchronous transfer.

21 Claims, 15 Drawing Sheets

SAVEWR
    R0(i)=M, R1(j)=C    ; SAVE "M"&"C"
    M=0, C=0, R0(k)=SM    ; SAVE "B"
    M=1, B=0, R1($\ell$)=SM    ; SAVE "A"

LOADWR
    M=R0(i), C=R1(j)    ; LOAD "M"&"C"
    B=R0(k), A=R1($\ell$)    ; LOAD "B"&"A"

$t_{sc}$ = SAMPLE CLOCK PERIOD DELAY
$k_n$ = CONSTANTS
$n$ = DATA PATH WIDTH

APPARATUS AND METHOD FOR SYNCHRONIZING DATA TRANSFERS IN A SINGLE INSTRUCTION MULTIPLE DATA PROCESSOR

This application is a Continuation of application Ser. No. 08/088,565, filed Jul. 7, 1993, now abandoned which is a CIP of Ser. No. 08/059,165, filed May 7, 1993, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to pending coassigned applications U.S. Pat. No. 5,321,510; U.S. Pat. No. 4,939,575; U.S. Pat. No. 5,163,120; Ser. No. 07/421,487 (TI-13639), now abandoned; U.S. Pat. No. 5,210,836; Ser. No. 07/421,472 (TI-14207) abandoned/combined into Ser. No. 08/035,519 (TI-14207A); Ser. No. 07/421,493 (TI-14210) abandoned/combined into Ser. No. 08/037,467 (TI-14210A); Ser. No. 07/421,488 (TI-14211) abandoned/combined into Ser. No. 08/009,432 (TI-14211A) abandoned/combined into Ser. No. 08/234,508 (TI-14211B); Ser. No. 07/421,473 (TI-14212) abandoned/combined into Ser. No. 08/105,659 (TI-14212A); U.S. Pat. No. 5,293,637; Ser. No. 07/421,494 abandoned/combined into Ser. No. 08/163,606; U.S. Pat. No. 5,327,541; and Ser. No. 07/421,471 (TI-14220); all of which are assigned to Applicant's assignee and the contents of said related cases are hereby incorporated herein by reference.

FIELD OF THE INVENTION

The present invention relates generally to single instruction, multiple data processors. More particularly, the invention relates to processors having a one dimensional array of processing elements, that finds particular application in digital signal processing such as Improved Definition Television (IDTV). Additionally, the invention relates to improvements to the processors, television and video systems and other systems improvements and methods of their operation and control.

BACKGROUND OF THE INVENTION

Fast and accurate real-time processing of data signals is desirable in general purpose digital signal processing, consumer electronics, industrial electronics, graphics and imaging, instrumentation, medical electronics, military electronics, communications and automotive electronics applications among others, to name a few broad technological areas. In general, video signal processing, such as real-time image processing of video signals, requires massive data handling and processing in a short time interval. Image processing is discussed by Davis et al. in Electronic Design, Oct. 31, 1984, pp. 207–218, and issues of Electronic Design for, Nov. 15, 1984, pp. 289–300, Nov. 29, 1984, pp. 257–266, Dec. 13, 1984, pp. 217–226, and Jan. 10, 1985, pp. 349–356.

Video signal processing requires the use of Finite Impulse Response (FIR) digital filters for many of the data processing applications. If the sampling frequency is carefully selected, the coefficients of the filters can be small ratios of powers of two or at least simple combinations of powers of two. Real time video signal processing requires that the operating processors receive and process the video signal and the data necessary to emulate digital filters at extremely fast rates. In the prior art a substantial portion of the processing time is consumed in obtaining the sample data from adjacent processors in the array. For example the processors in the array would have to execute a series of instructions to address, read and transfer data located in its next adjacent processor until it reaches the desired location in the array. In a large array, this sequence of transferring the data from one processor to the next until it reaches a desired location is time consuming. If a finite time exists to receive and process the data, a large data retrieval time will of course leave less time for data processing. Therefore a technique for reducing the data retrieval time in a synchronous vector processor is desired in the art.

A typical Scan-line Video Processor (SVP) is operable to transfer data from an input to an output by first storing the data in a Data Input Register (DIR) and then transferring it to a Data Output Register (DOR), with a Processing Element (PE) disposed therebetween for processing the data. In general, conventional SVPs operate on a concurrent line-by-line operation and in a synchronized manner. The data transfer from the DIR to the PE must be performed during a horizontal blanking period of the input signal. Otherwise, current data and prior data from the previous horizontal scan line in the DIR is read by the PE. Furthermore, Write-Read contention may occur between a Write-by-DIR operation and a Read-by-PE operation against the same DIR memory cell. To allow maximum signal processing in the PE, the data transfer from the PE to the DOR should occur just before the data transfer from the DIR to the PE, or the data transfer from the DIR to the PE should occur just before the data transfer from the PE to the DOR. Therefore, the synchronization between the input and the output with a unique SYNC signal must be utilized. In order to compensate for more than one horizontal line of time base error, it is necessary to utilize some type of asynchronous data Read/Write to the line memories. The present systems do not offer this feature.

SUMMARY OF THE INVENTION

The present invention disclosed and claimed herein comprises a processor for receiving data, processing the received data and then outputting the processed data. The processor includes a data input register for receiving a first register file RF1 for storing the input data, an ALU for processing the data in accordance with a predetermined processing algorithm and a data output register for receiving a second register file RF0 for storing the processed data from the ALU and subsequently outputting the processed data. A first transfer circuit is provided for transferring data from the data input register to the processor for processing thereof by a predetermined processing algorithm to provide for output therefrom processed data. A second transfer circuit is operable to transfer the output processed data from the processor element to the data output register. The first clock circuit synchronizes the operation of the first transfer circuit and a second clock circuit synchronizes the operation of the second transfer circuit. The first and second clock circuits are asynchronous in operation. An interrupt circuit is operable to interrupt the processing operation of a processing element during the transfer operation of at least one of the first or second transfer circuits.

In another aspect of the present invention, the interrupt circuit is operable to interrupt the processor operation during the transfer operation of only one of the transfer circuits. The first clock circuit is operable to track jitter in the input data and the second clock circuit is referenced to a stable reference compared to the operation of the first clock circuit. During the transfer operation that operates during the interrupt period, an elastic buffer is provided in the register files RF1 and RF0. The buffer has associated therewith Write and Read pointers. The Write pointer is associated with one of the first and second clock circuits and the Read pointer is associated with the other of the first and second clock circuits.

BRIEF DESCRIPTION OF THE DRAWINGS

For a more complete understanding of the present invention and the advantages thereof, reference is now made to the following description taken in conjunction with the accompanying Drawings in which:

FIG. 8b illustrates timing diagram for the circuitry of FIG. 8a;

FIG. 17b illustrates an exploded and reorganized view of a portion of FIG. 17a;

DETAILED DESCRIPTION OF THE PREFERRED EMBODIMENTS

Figure 1:
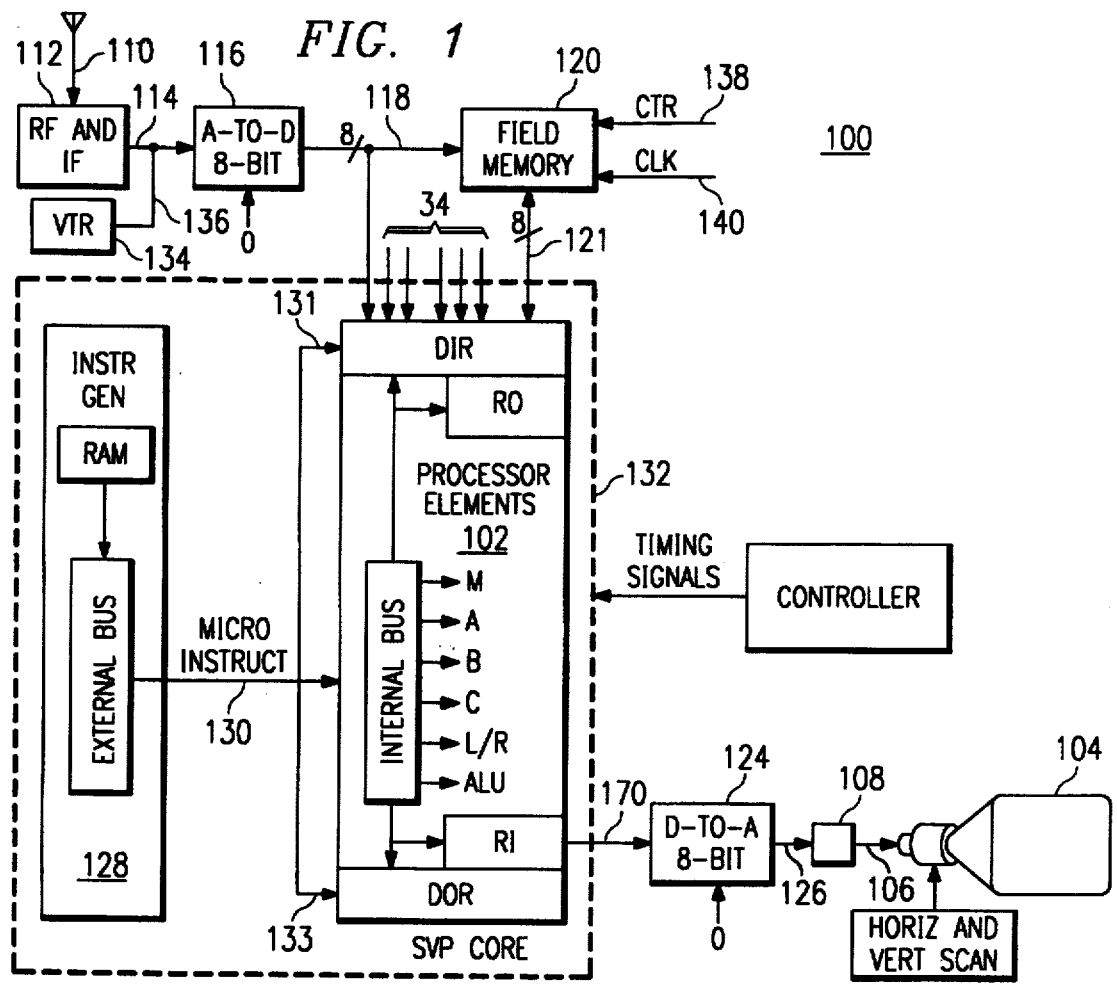
FIG. 1 illustrates a video system using a synchronous vector processor.

In the following discussion of the preferred embodiments of the invention, reference is made to drawing figures. Like reference numerals used throughout the several figures refer to like or corresponding parts.

An SVP, Scan-line Video Processor, of a preferred embodiment, is a general purpose mask-programmable single instruction, multiple data, reduced instruction set computing (SIMD-RISC) device capable of executing in real-time the 3-D algorithms useful in Improved and Extended Definition Television (IDTV and EDTV) systems. Although the SVP of the invention is disclosed for video signal processing in the preferred embodiment, the hardware of the SVP works well in many different applications, so no particular filters or functions are implied in the architecture. Generally, the SVP can be used in any situation in which large numbers of incoming data are to be processed in parallel.

In a typical application, such as video signal processing, the Input and Output layers operate in synchronism with the data source (such as video camera, VCR, receiver, etc.) and the data sink respectively (such as the raster display). Concurrently, the Computation layer performs the desired transformation by the application of programmable functions simultaneously to all the elements of a packet (commonly referred to as a VECTOR: within the TV/Video environment all the samples comprising a single horizontal display line). Thus the SVP is architecturally streamlined for Synchronous Vector Processing.

Referring now to FIG. 1, there is illustrated a TV or video system 100 includes a synchronous vector processor device 102. System 100 comprises a CRT 104 of the raster-scan type receiving an analog video signal at input 106 from standard analog video circuits 108 as used in a conventional TV receiver. A video signal from an antenna 110, is amplified, filtered and heterodyned in the usual manner through RF and IF stages 112 including tuner, IF strip and sync separator circuitry therein, producing an analog composite or component video signal at line 114. Detection of a frequency modulated (FM) audio component is separately performed and not further discussed here. The horizontal sync, vertical sync, and color burst are used by instruction generator 128 to provide timing to the SVP 102 and thus are not part of SVP's data path. The analog video signal on line 114 is converted to digital by analog-to-digital converter 116. The digitized video signal is provided at line 118 for input to the synchronous vector processor 102.

The processor 102 processes the digital video signal present on line 118 and provides a processed digital signal on lines 170. The processed video signal is then converted to analog by a digital-to-analog converter 124 before being provided via line 126 to standard analog video circuits 108. Video signals can be provided to analog-to-digital converter 116 from a recorded or other non standard signal source such as video tape recorder 134. The VCR signal is provided on line 136 and bypasses tuner 112. One or more video frames can be stored in a field memory 120, which is illustratively a Texas Instruments Model TMS4C1060 field memory device. Field memory 120 receives control and clocking on lines 138 and 140 from instruction generator 128. The video signal input on line 114 is converted to 8-bit digitized video data by analog-to-digital converter 116 at a sampling rate of, for example, 14.32 MHz (a multiple x4 of the color subcarrier frequency, 3.58 MHz). There are a total of 40 input lines to SVP 102. As stated, eight are used for the digitized video signal. Others are used as inputs for frame memory output, alternate TV source, etc. Digital-to-analog converter 124 can also reconstruct at the rate of 14.32 MHz to convert an 8-bit processor output to analog. The remaining output lines may be used for other signals. Alternatively, digitalto-analog converters 116 and 124 can operate at different sample rates and have a different bit resolution as desired for a particular purpose.

Processor 102 is operated by an instruction generator 128. Instruction generator 128 feeds twenty-four micro-instruction bits and two 7-bit addresses on lines 130 to processor 102. For relatively low speeds, instruction generator 128 is suitably a standard microprocessor or microcontroller device such as commercially available Texas Instruments Model TMS 370C050, for example. For faster speeds, a higher speed controller stores software code in RAM or ROM, or a state machine or sequencer is employed. The instruction generator 128 is suitably located on the same semiconductor chip as the processor 102 to form a unit 132, of FIG. 1, especially if it essentially comprises stored code in a ROM with an associated address counter. The Microinstructions can control the operation of seven fundamental (or "primitive") gating and ALU functions within a single cycle. All of the processing elements (PEs) are controlled by the same instruction; thus the architectural designation Single Instruction Multiple Data (SIMD).

Figure 2:
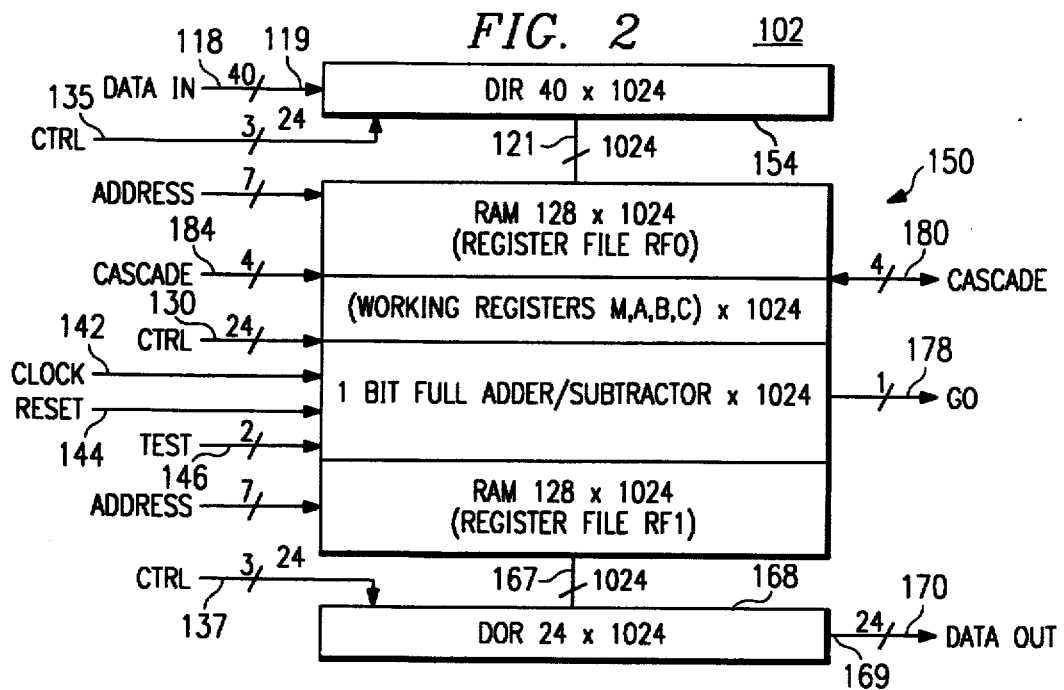
FIG. 2 illustrates the synchronous vector processor as used in the FIG. 1 system in greater detail.
Figure 3:
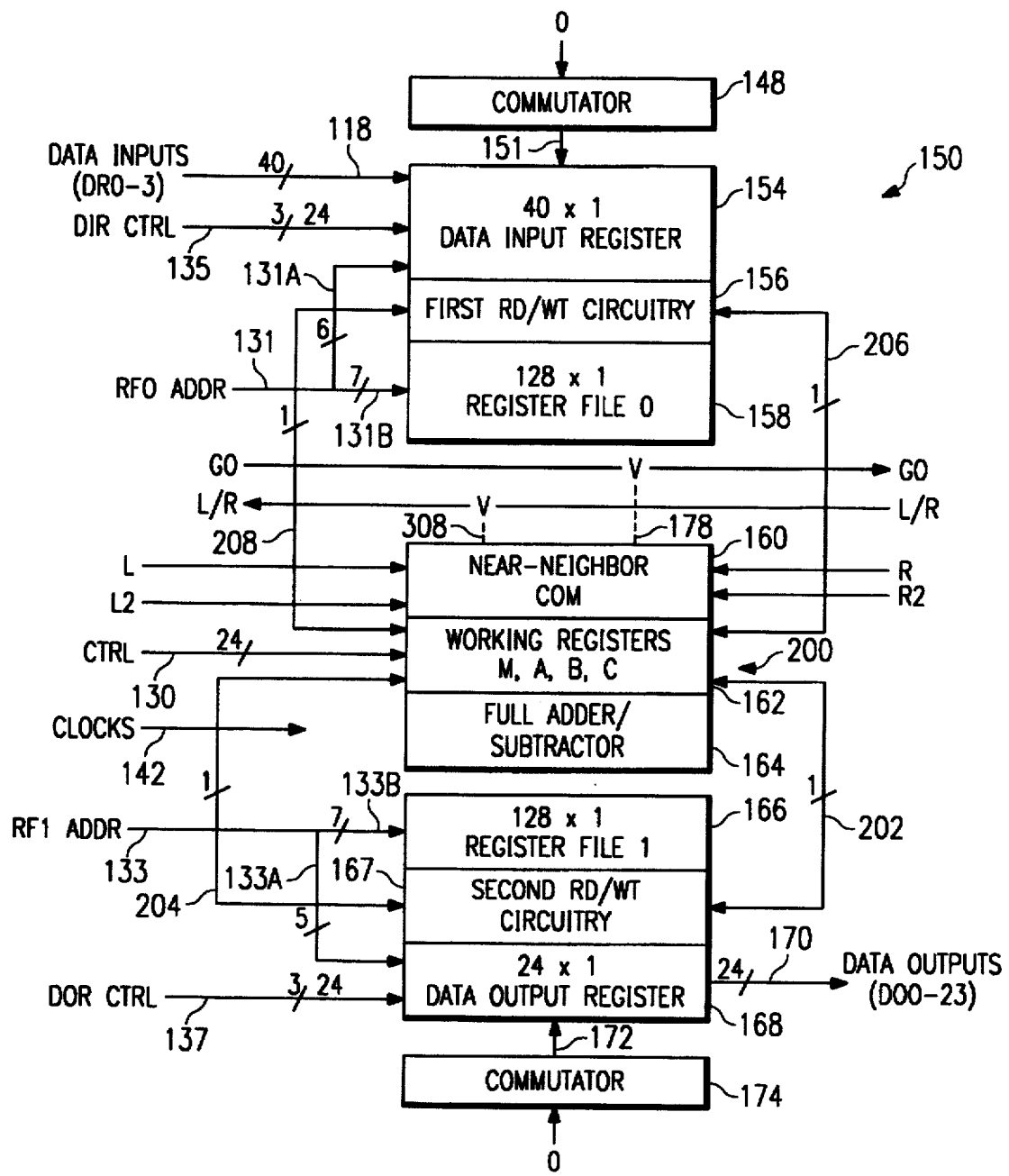
FIG. 3 illustrates one processor element of the FIG. 2 synchronous vector processor.

Referring now to both FIG. 2 and FIG. 3, there is illustrated a preferred embodiment of the SVP device 102 which includes a one-dimensional array having 1024 1-bit processing elements (PE) 150. An individual processor element 150 is depicted in FIG. 3. Each processor element 150 comprises a forty-bit data input register (DIR) 154, organized as 40×1; a first 128-bit register file (RF0) 158, organized as 128×1; working registers A,B,C and M 162; an arithmetic logic unit 164 including a 1-bit full adder/subtractor; a second 128-bit register file (RF1) 166, organized as 128×1; and a 24-bit data output register (DOR) 168, organized as 24×1. Processor 102, as depicted in FIG. 3, further comprises first read/write circuitry 156 to control reading and writing of data between the DIR/RF0 registers 154/158 working registers A,B,C and M 162, and arithmetic logic unit 164. Second read/write circuitry 167 is provided to control reading and writing of data between DOR 168/RF1 166 registers 166/168, working registers A,B,C and M 162, and arithmetic logic unit 164. As will be described hereinbelow, the transfer operations of DIR-to-PE and PE-to-DOR occur asynchronously.

Data flow within the PEs is pipeline in three layers or pipeline steps, Input, Computation and Output. In the input layer, the Data Input Register (DIR) acquires or accumulates a packet of data word-serially. In the computation layer the programmed operations are performed simultaneously on all the elements of an already acquired packet via a processor-per-word operation. The output layer transfers yet another packet from the Data Output Register (DOR) to the output pins, again word-serially. Within each phase of the computation layer pipeline, a multiplicity of cycles/instructions perform the required operations. The input and output layers or pipeline steps accumulate one data word per cycle, but minimize the I/O pin requirements by using multiple cycles to transfer the entire packet of data. The number of data words per packet is hardware or software established for each application or system subject to the size of the processor element array; 1024 in the preferred embodiment.

The computation layer or pipeline step also uses multiple cycles to operate on the data. The ALU and data paths dedicated to each data word are one bit wide. Thus functions on multibit words can be computed in multiple cycles.

DIR 154 loads the digitized video signal from lines 118, when an enable signal is applied at input 151. This enable signal is supplied by a 1-of-1024 commutator, sequencer or ring counter 148. Commutator 148 is triggered to begin at the end of a horizontal blanking period, when a standard video signal is present on lines 118, and continue for up to 1024 cycles (at 14.32 MHz) synchronized with the sampling rate (frequency) of analog-to-digital converter 116. Similarly, DOR 168 provides the processed video signal on lines 170 when an enable signal is applied at input 172. This enable signal is received from another 1-of-1024 commutator, sequencer or ring counter 174. Commutator 174 is triggered to begin at the end of a horizontal blanking period and continue for 1024 cycles synchronized with the sampling rate of analog-to-digital converter 124.

Each PE has direct communication with its four nearest neighbors (two to the left and two to the right). Each of the two register files (RFs) is capable of independent addressing, each PE operates with read-modify-write cycles such that two different RF locations can be read, the data operated upon by Arithmetic Logic Unit (ALU) 164, and the result written back into one of the register files RF0 or RF1 locations in a single clock cycle.

External lines are connected in common to all of the processor elements, PEs 150, in the processor array of FIG. 3. They include forty data input lines 118, 7 DIR/RF0 address lines 131, 24 master control lines 130, clock and reset signal lines 142 and 144, 2 test lines 146, 7 DOR/RF1 address lines 133, 24 data output lines 170 and a 1-bit global output 178 (GO) line.

The I/O system of the SVP 102 comprises the Data Input Register 154 (DIR) and the Data Output Register 168 (DOR). DIR 154 and DOR 168 are dual-ported memories (sequentially address from/to I/O pins, and randomly accessed by the PE) and operate as high speed shift registers for data input and output. Both DIR and DOR are dynamic memories in the preferred embodiment. As will be described hereinbelow, one of the DIR and DOR is synchronous to the PEs 150 in the general case and the other is not. Therefore, some type of synchronization must have occurred before data is transferred between DIR/DOR and the PEs 150. This usually occurs during the horizontal blanking period in video applications. In some applications the DIR, DOR, and PEs may operate synchronously, but in any case it is not recommended to read or write to both ports of one of the registers simultaneously. In the preferred embodiment, an elastic buffer is utilized to insure that overall system synchronous operation is achieved, which will be described hereinbelow.

Figure 4:
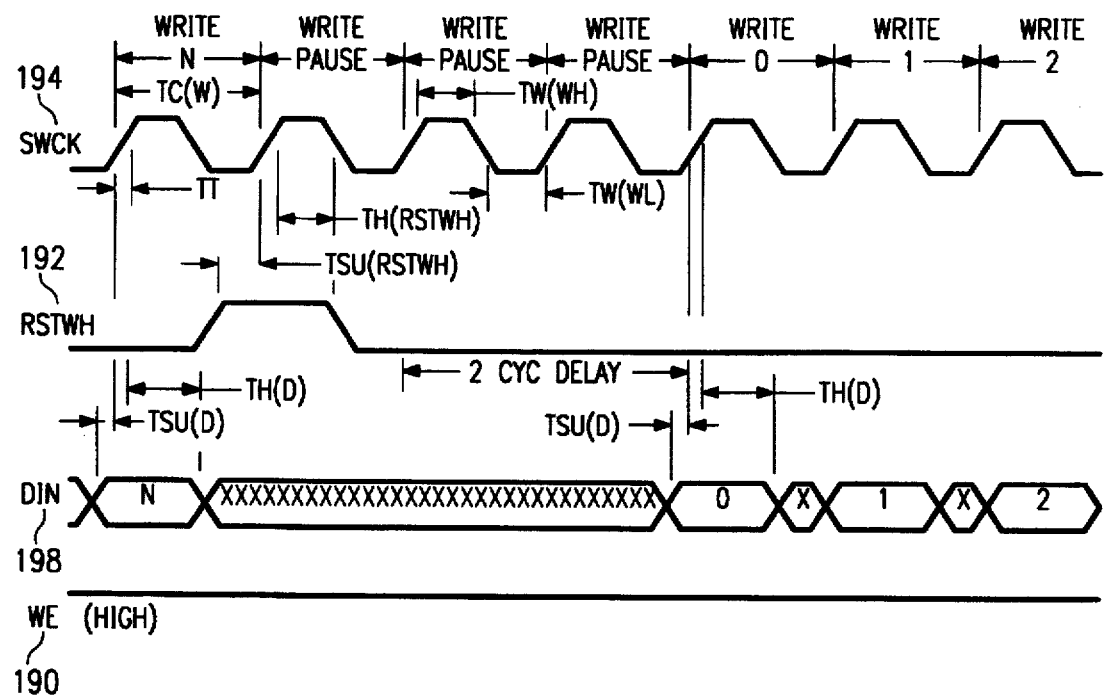
FIG. 4 illustrates a timing diagram for a Data Input Register write.
Figure 5:
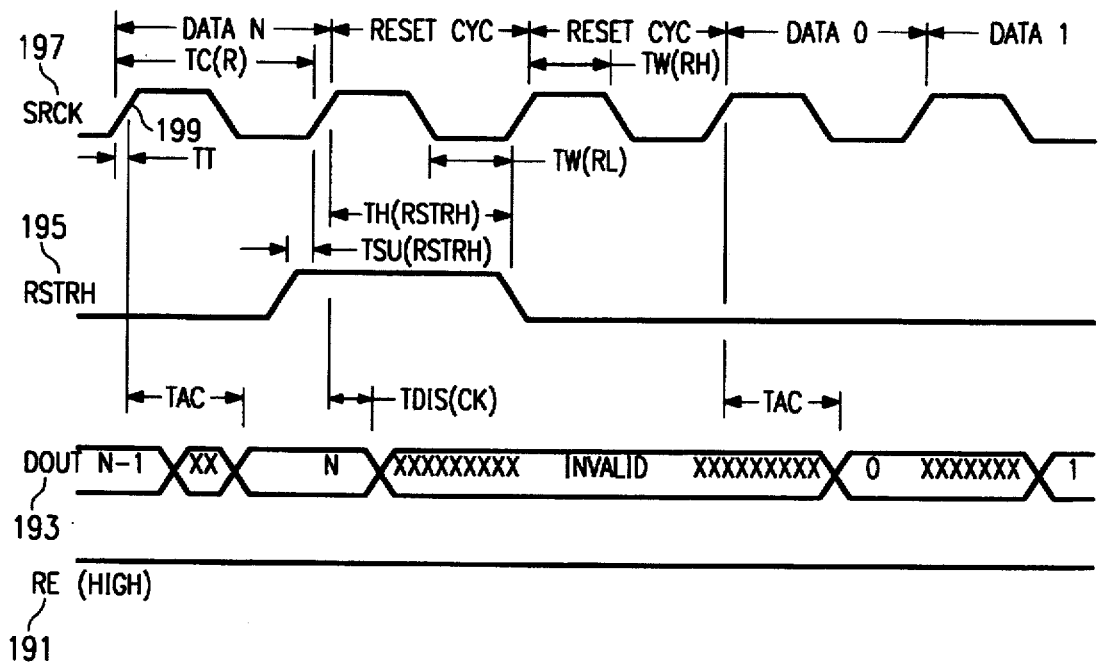
FIG. 5 illustrates a timing diagram for a Data Output Register read.

With reference again to FIG. 2, the DIR of processor 102 is a 40960 bit dynamic dual-ported memory. One port 119 is organized as 1024 words of 40 bits each and functionally emulates the write port of a 1024 word line memory. FIG. 4 depicts a timing diagram for a DIR write. The 40 Data Inputs 118 (DI0 through DI39) are used in conjunction with timing signals Write Enable 190 (WE), Reset Write 192 (RSTWH), and Write Clock 194 (SWCK). WE 190 controls both the write function and the address pointer 148 (commutator) increment function synchronously with SWCK 194. When high, the RSTWH 192 line resets the address pointer 148 to the first word in the 1024 word buffer on the next rising edge of SWCK. SWCK 194 is a continuous clock input. After an initial three clock delay, one 40 bit word of data 198 is written on each subsequent rising edge of SWCK 194. If data words 0 to N are to be written, WE remains high for N+1 rising edges of SWCK. The address pointer 148 may generally comprise a 1-of-1024 commutator, sequencer or ring counter triggered to begin at the end of a horizontal blanking period and continue for 1024 cycles synchronized with the sampling frequency of the A-to-D converter 116.

The input commutator 148 is clocked at above 1024 times the horizontal scan rate. The output commutator 174 can be, but not necessarily, clocked at the same rate as the input.

It should be noted at this time that although, for purposes of discussion, processor 102 is depicted as having 1024 processor elements, it can have more or less. The actual number is related to the television signal transmission standard employed, and sampling frequency utilized namely NTSC, PAL or SECAM, or the desired system or functions in non television applications.

The second port 121 of data input register 154 is organized as 40 words of 1024 bits each; each bit corresponding to a processor element 150. Port 121 is physically a part of, and is mapped into the absolute address space of RF0; therefore, the DIR and RF0 are mutually exclusive circuits. When one is addressed by an operand on a given Assembly language line of assembler code, the other cannot be. An Assembly language line which contains references to both will generate an error at assembly-time.

With reference again to FIG. 3, DOR 168 is a 24576 bit dynamic dual-ported memory. One port 169 is organized as 1024 words of 24 bits each and functionally emulates the read port of a 1024 word line memory. The Data Outputs (DO0 through DO23) 170 are used in conjunction with the signals Read Enable (RE), Reset Read (RSTRH), and serial Read Clock (SRCK). SRCK 197 is a continuous clock input. RE 191 enables and disables both the read function and the address pointer increment function synchronously with SRCK 197. When high, the RSTRH line 195 resets the address pointer (commutator) to the first word in the 1024 word buffer on the next rising edge 199 of SRCK 197. After an initial two clock delay, one 24 bit word of data is output an access time after each subsequent rising edge of SRCK. If data words O to N are to be read, then RE must remain high for N+1 rising edges of SRCK. As discussed hereinabove with reference to DIR 154, the address pointer 174 can similarly comprise a 1-of-1024 commutator or ring counter.

The second port of data output register 168 is organized as 24 words of 1024 bits each; each bit corresponding to a Processor Element 150. Port 167 of DOR 168 is physically a part of, and is mapped into the absolute address space of RF1 166; therefore, the DOR 168 and RF1 166 are mutually exclusive circuits. When one is addressed by an operand on a given Assembly language line, the other cannot be. An Assembly language line which contains references to both will generate an assembly-time error. DOR 168 works independently of DIR 154; therefore it has its own address lines 133 and some of its own control lines 137. Further, they operate asynchronously in the preferred embodiment. RF0 158 works independently of RF1 166; therefore it has its own address lines 131 and some of its own control lines, and RF1 166 works independently of RF0 158; therefore it has its own address lines 133 and some of its own control lines.

With further reference to FIG. 3, the Read/Write circuitry 156 and the Read/Write circuitry 167 include one or more sense amps. The RF0 basically comprises a 128-bit dynamic random access memory configured 1×128. In practice, the RF0 data memory 158 and the DIR input register 154 are both parts of the 1×168 DRAM column, but the DIR 154 differs from the RF0 158 in that the DIR 154 can be written into from the inputs, which comprise forty parallel bits. Data is sensed and then transferred between the registers and multiplexers 200 and the memory banks DIR/RF0 and DOR/RF1 via I/O lines 202, 204, 206 and 208. The particular bit being addressed in the RF0 158 is selected by internal word lines. The instruction generator 128 provides six address bits 131A to DIR 154 for a 1-of-64 address selection; the seventh bit is decoded as "=0" for DIR selection, "1" for DIR deselected and provides seven address bits 131B to RF0 158 for a 1-of-128 address selection. The same address selection is provided to RF0 or DIR of all 1024 processor elements 150. Likewise, a second 1-bit wide dynamic RAM 166, referred to as RF1, receives seven address bits 133B for a 1-of-128 address selection. The RF1 166 memory is associated with a 24-bit data output register 168 called DOR, receiving five address bits 133A for 1-of-32 address selection. The input commutator 148 is clocked at above 1024 times the horizontal scan rate, so all 1024 of the input registers 154 can be loaded during a horizontal scan period.

The pointer input 151 from the commutator 148 is operable to gate 40 internal data lines (not shown) to internal dual port dynamic memory cells. Reading and writing can be performed for each port on the memory cells with DIR operating as a dynamic shift register. The dual port nature allows synchronous communication of data into and out of the DIR. By utilizing dynamic cells, the shift register layout is greatly reduced.

DOR 168 also operates as a high speed dynamic shift register. However, the DOR 168 utilizes a three-transistor dual port cell having gain associated therewith. Since it is a dynamic random access memory, the memory element is a capacitor with a gain transistor circuit allowing reading of the charge on the capacitor without destroying the stored charge therein. This operation will not be described herein. The control address lines 130 receive many lines, certain ones being a C21, C8, C2, C1 and C0 and the contents of the M-working register in the block 200. Additionally, the addresses RF0A6 through RF0A0 input on address lines 131 to the RF0 register 158 also provide control. The control line C2=1 selects the DIR 154. The seven address lines RF0A6–RF0A0 select 1-of-40 bits to be read or written to while C1 and C0 select the Write source (for a Read C0 and C1 it does not matter). With certain combinations of lines C1 and C0, the Write source for DIR 154 depends on the state of C21 and C8 and the contents of working register M(WRM). These form instructions are called M-dependent instructions which allow more processor 102 flexibility. Table 1 sets forth the control line function for DIR 154.

TABLE 1

| C21 | C8 | C2 | C1 | C0 | (WRM) | Operation on DIR |
|---|---|---|---|---|---|---|
| X | X | 0 | X | X | X | RF0 selected |
| X | X | 1 | 0 | 0 | X | DIR (m) written into DIR(m) (refresh) |
| X | X | 1 | 1 | 0 | X | SM written into DIR(m) |
| X | X | 1 | 1 | 1 | X | (WRM) written into DIR(m) |
| 0 | X | 1 | 0 | 1 | X | (WRC) written into DIR(m) |
| 1 | 0 | 1 | 0 | 1 | 0 | (L/R line of right PE to DIR(m) |
| 1 | 0 | 1 | 0 | 1 | 1 | (L/R line of left PE to DIR(m) |
| 1 | 1 | 1 | 0 | 1 | 0 | (L/R line of 2nd right PE to DIR(m) |
| 1 | 1 | 1 | 0 | 1 | 1 | (L/R line of 2nd left PE to DIR(m) | where, 'm' is the binary combination of {RF0A6, RF0A5 ... RF0A0} and is in the range, 0<=m<=39. The range 40<=m<=127 is reserved.

Similar to the DIR 154, the exact function of the DOR 168 is driven by control lines 130, the control lines being C21, C5, C4, C3 and the contents of the working register M and also by addresses RF1A6–RF1A0. Control line C5=1 selects the DOR 168. The seven address lines 133 select 1-of-24 bits to be read or written to while C4 and C3 select the Write source. With certain combinations of control lines C4 and C3, the Write source DOR 168 depends on the state of C21 and the state of working register M. These form instructions called M-dependent instructions which allow more processor 102 flexibility. Table 2 sets forth the control line functions for DOR 168.

TABLE 2

| C21 | C5 | C4 | C3 | (WRM) | Operation on DOR |
|---|---|---|---|---|---|
| X | 0 | X | X | X | RF1 selected |
| X | 1 | 0 | 0 | X | DOR(q) written into DOR(q) (refresh) |
| X | 1 | 0 | 1 | X | (WRC) written into DOR(q) |
| X | 1 | 1 | 0 | X | SM written into DOR(q) |
| 0 | 1 | 1 | 1 | X | CY written into DOR(q) KCY - Conditional Carry: |
| 1 | 1 | 1 | 1 | 0 | DOR(q) written into DOR(q) |
| 1 | 1 | 1 | 1 | 1 | CY written into DOR(q) |

Where, 'q' is the binary combination of {RF1A6, RF1A5 ... RF1A0} and is in the range, $0<=q<=23$. The range $24<=q<=127$ is reserved.

As described above, the data input to the DIR 154 and the data output from the DOR 168 is an asynchronous operation controlled by an interrupt transfer from DIR-to-PE or from PE-to-DOR. This is utilized to correct for a time based error, thus allowing the system to realize Time Based Correction (TBC). However, the previous systems would not provide TBC. These systems typically utilized a phase lock loop to generate a Write clock from the horizontal sync of the input video signal, which phase lock loop had a response time fast enough to follow the time based jitter of the input video signal. A second phase lock loop would then generate a Read clock which was based on a crystal oscillator to provide a stable reference clock. By utilizing a stable Read clock, the time based error would be compensated for.

For a synchronous operation, data is first input to the DIR 154 and then processed with the PE followed by output from the DOR. These are "concurrent" operations in 1H and are synchronized. The data transferred from DIR-to-PE and from PE-to-DOR are required in the same period such as during the horizontal blanking. Otherwise, current and 1H prior data would be read by the PE and, furthermore, Write-Read contention would occur between Write-by-DIR and Read-by-PE against the same DIR memory cell. The same problem will exist between the PE and the DOR 168. Therefore, to account for this, synchronization is provided in previous systems between the input and the output with an SYNC signal. The present embodiment described herein provides for asynchronous operation.

Figure 6:
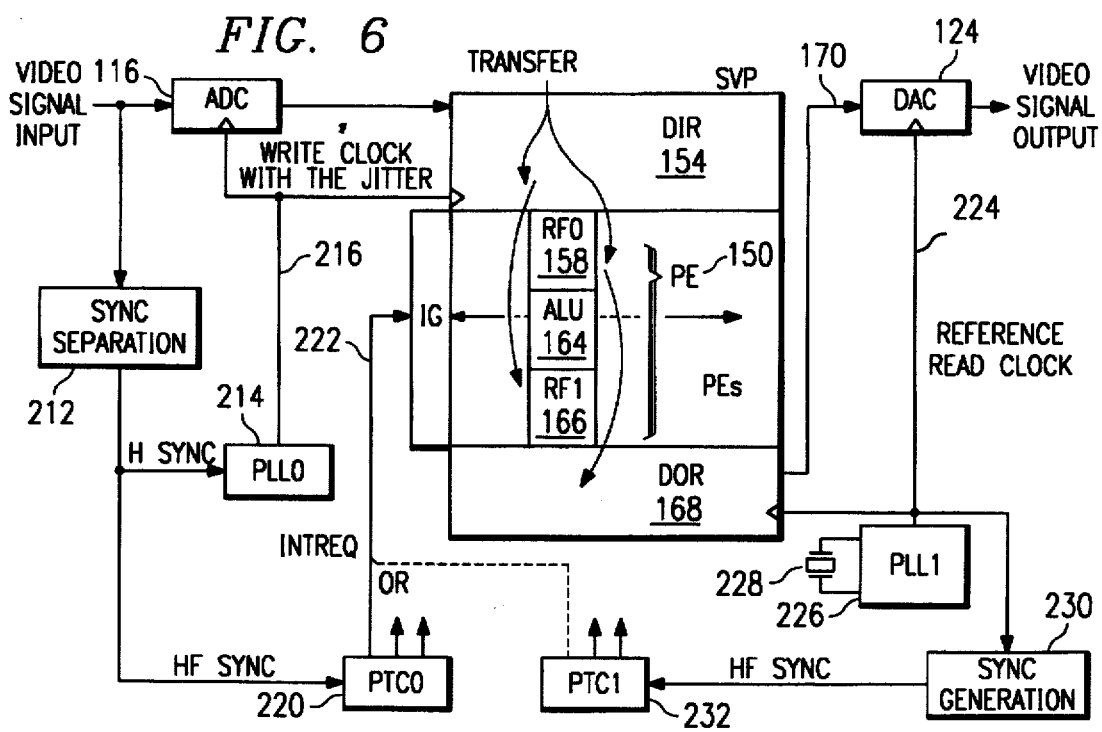
FIG. 6 illustrates a block diagram illustrating the hardware interrupt method of the present invention.

Referring now to FIG. 6, there is illustrated a block diagram illustrating the hardware interrupt method of the present invention. The video input signal is input to a sync separation circuit 212, the sync output providing the horizontal sync H. SYNC and the field or frame sync F. SYNC. This is input to a phase lock loop 214, labelled PLL0, which is a relatively fast phase lock loop such that it will track the jitter in the input signal. The clock signal is output on a line 216, which is then utilized to clock the analog-to-digital converter 116. This is a the Write clock which has the input jitter associated therewith. This clock is utilized to clock the DIR 154. Additionally, this clock signal is input to a program timing controller (PTCO) 220. The PTCO 220 is operable to output an interrupt request on lines 222. In this case, an interrupt input (DIR-to-PE) is performed. The DOR 168 is controlled by a reference Read clock on a line 224. The reference Read clock is generated by a second phase lock loop (PLL1) 226 which utilizes a crystal 228 for a reference. The reference Read clock is utilized to clock the DOR 168 and also to provide the reference Read clock on a line 224. This is input to a sync generator 230 to generate the H.F.SYNC as the stable clock signal which is input to a program timing controller (PTC1) 232. This is also utilized to generate interrupt request signals INTREQ for inclusion on the line 222. In this case, interrupt output (PE-to-DOR) is performed.

The interrupt request signal is input to the Instruction Generator (IG) which contains the processing elements 150. The PEs 150, as described above, are comprised of the RF0 158, the ALU 164 (and associated working registers) and the RF1 166.

Figure 7:
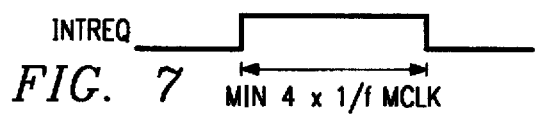
FIG. 7 illustrates the signal INTREQ.

The signal INTREQ is illustrated in FIG. 7 and is generated by external hardware and provides a minimum enable time of 4×1/F MCLK (MCLK being the main clock). The INTREQ is synchronized to the H-SYNC on either the data input or the data output. The SVP 102 provides an input pin to enable the interrupt operation to the Instruction Generator (IG).

When the SVP 102 is executing instructions by the repeat function, a standard function of a SVP, the SVP does not operate the INTREQ function until the repeat function is completed. Therefore, the INTREQ signal holds the Enable state until the repeat function is completed. The maximum repeat clock cycle is sixteen. Additionally, the SVP 102 cannot accept another INTREQ during the time the interrupt routine is performed. This constitutes a single level interrupt capability. An interrupt mask is utilized which is set when the INTREQ is accepted and then reset when the RET instruction is executed.

Figure 8A:
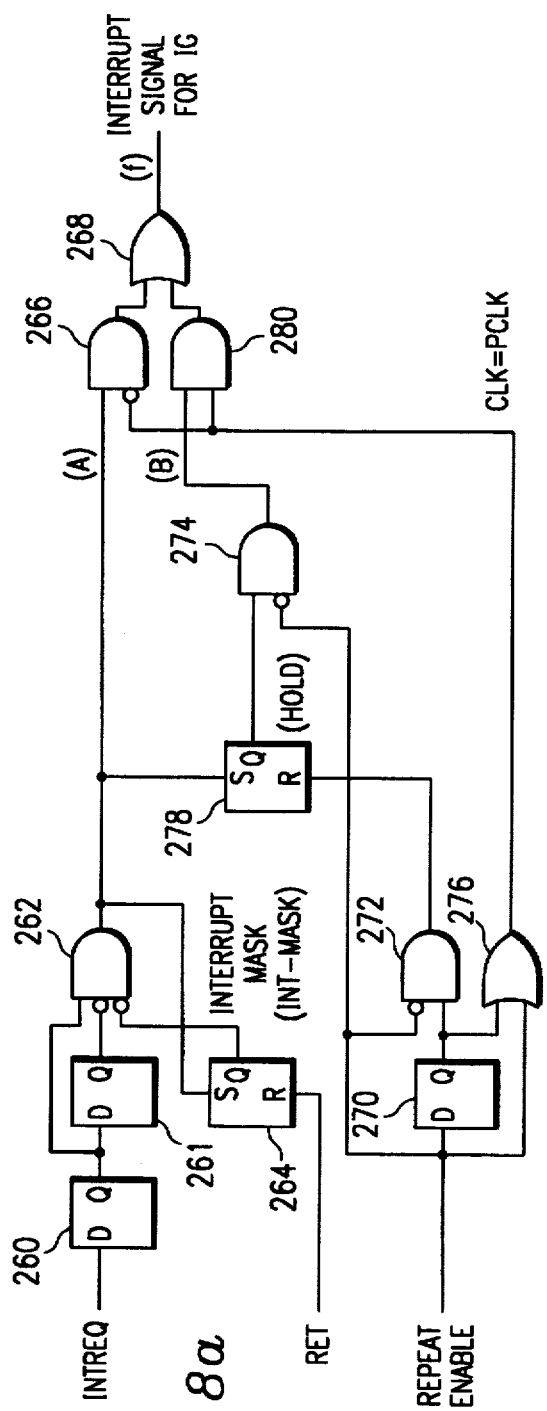
FIG. 8a illustrates a logic diagram of the circuitry for varying the interrupt signal for the Instruction Generator (IG)
Figure 8B:
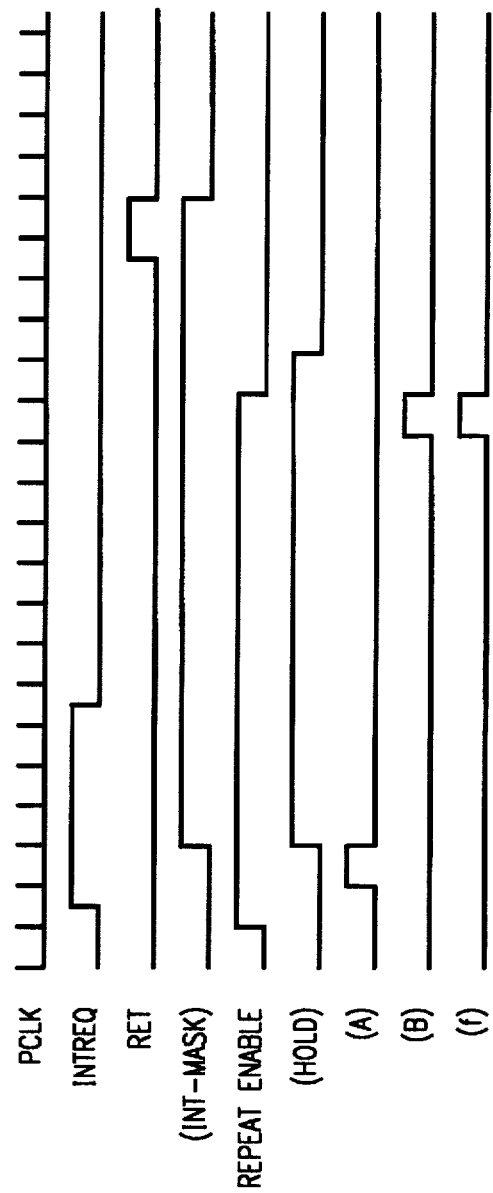

Referring now to FIG. 8a, there is illustrated an exemplary logic diagram of the circuitry for varying the interrupt signal for the Instruction Generator (IG). The INTREQ signal is input to the data input of a flip flop 260, the output thereof connected to the data input of a flip flop 261 and also to one input of a three input AND gate 262. The output of flip flop 261 is connected to the inverting input of gate 262. The signal RET is input to the reset input of a flip flop 264, the set input connected to the output of gate 262. The output of flip flop 264 is connected to an inverting input of the gate 262. The output of flip flop 264 comprises the interrupt mask signal INT-MASK. The output of gate 262 is connected to one input of an AND gate 266, the output thereof connected to one input of an OR gate 268. The output of the OR gate 268 comprises the interrupt signal to the IG. The REPEAT ENABLE signal is input to the data input of a flip flop 270, the inverting input of an AND gate 272, the inverting input of an AND gate 274 and one input of an OR gate 276. The output of flip flop 270 is connected to the other input of OR gate 276 and the other input of the AND gate 272. The output of AND gate 272 is connected to the reset input of a flip flop 278, the set input thereof connected to the output of gate 262 and the output of flip flop 278 connected to the other input of gate 274. The output of gate 274 is connected to one input of an AND gate 280 and the output of OR gate 276 is connected to the other input of gate 280 and an inverting input of gate 266. The output of gate 280 is connected to the other input of gate 268. The timing diagram for the circuitry of FIG. 8a is illustrated in FIG. 8b. It can be seen that when the REPEAT ENABLE signal is high, the INTREQ is held until the falling edge of the REPEAT ENABLE signal (+1 PCLK cycle) occurs.

Figure 9:
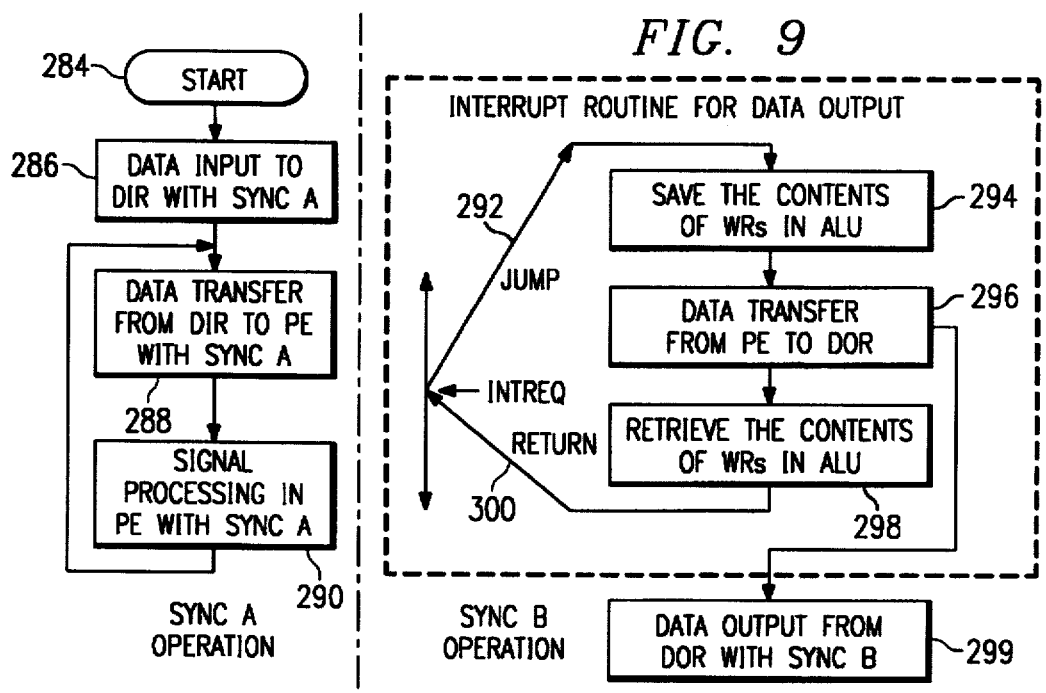
FIG. 9 illustrates a flowchart for the SYNC A operation.

There are two sync operations, a SYNC A operation and a SYNC B operation. During the SYNC A operation, the interrupt routine is associated with the data input. A concept for this is illustrated in FIG. 9, which is initiated at a start block 284. FIG. 9 is divided into two sections, a SYNC A section and a SYNC B section. In the SYNC A operation, data is input to the DIR with the SYNC A clock, as indicated by a function block 286. The program then flows to a function block 288 to effect data transfer from the DIR to the PE with the SYNC A clock, and then flows to a function block 290 to perform signal processing in the PE with the SYNC A clock and then flows back to the input of function block 288 to continue data transfer.

In the SYNC B operation, the interrupt is first generated and, when the INTREQ is high, the interrupt routine is entered and the program halts the SYNC A operation and goes to the SYNC B operation, which is initiated along a JUMP path 292 and then proceeds to a function block 294 to save the contents of the working registers in the ALU, and then flows to a function block 296 to transfer data from the PE to the DOR. The data is then output, as indicated by a block 299, and the program then flows back to a function block 298 to retrieve the contents of the working registers in the ALU and then back along a return path 300 to the SYNC A operation. Only during the presence of the INTREQ being high will the interrupt routine be entered and will data be transferred from the PE to the DOR. In this routine, it can be seen that both data transfer from the DIR to the PE and processing in the PE is done with SYNC A timing.

Initially, when INTREQ is active (high level), the next value of the IG program counter is stored in the return address register to return from the interrupt routine and then the program would jump to the interrupt routine. In the preferred embodiment, the interrupt vector is located at an address 7FEh in the IG memory. The IG program must put a JMT instruction at the 7FEh address to jump to the interrupt routine.

Figure 10:
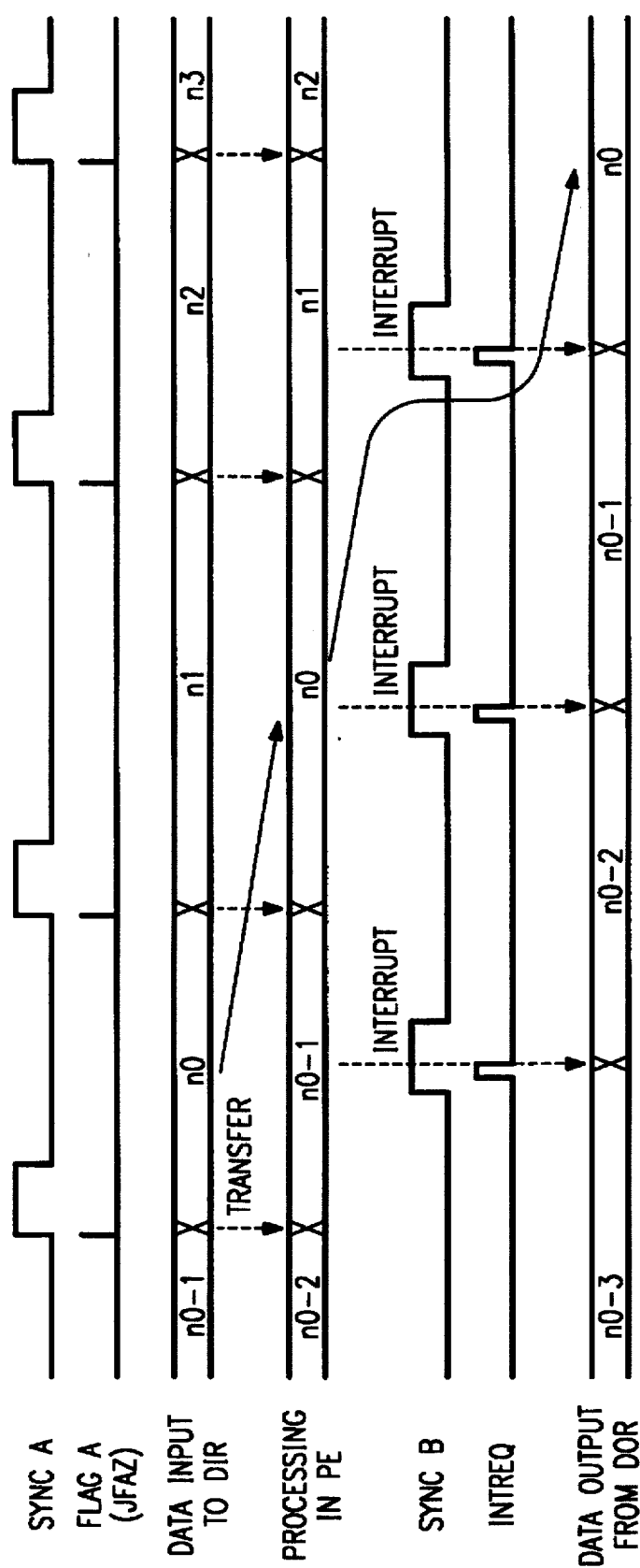
FIG. 10 illustrates a flowchart illustrating the synchronous data operations against the signal processing and the data output operation wherein both the output operation and the data processing operation operate on the SYNC B clock.

Referring now to FIG. 10, there is illustrated a timing diagram for FIG. 9 It can be seen that the transfer operation of the data in the DIR to the PE is done on a concurrent basis, i.e., they are synchronized. Therefore, on one cycle, data is input to the DIR and transferred at the end of the input data to the PE. On the next cycle the PE processes this data. The INTREQ signal is generated during SYNC B signal and, on the falling edge of the INTREQ signal, data transfer can occur. This is less than a 1H offset.

Figures 11, 13:
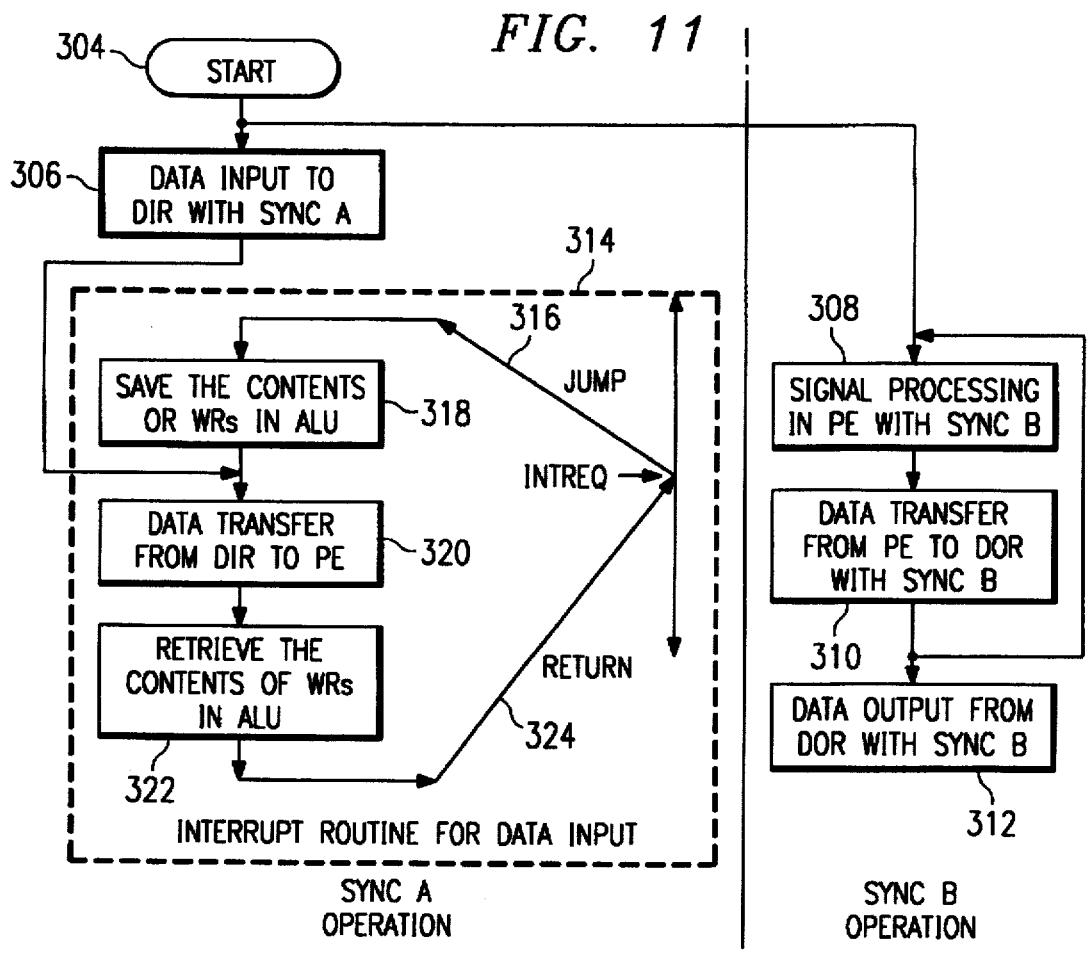
FIG. 11 illustrates a timing diagram for the flowchart of FIG. 9.
FIG. 13 illustrates a microinstruction list for SAVWR and LOADWR.

Referring now to FIG. 11, there is illustrated a concept illustrating the synchronous data operations against the signal processing and the data output operation wherein both the output operation and the data processing operation operate on the SYNC B clock, The program is initiated at a start block 304 and then proceeds to a function block 306 to input the data to the DIR with the SYNC A clock. The program also flows to a function block 308 on the SYNC B side of the FIG. 11 to process the data in the PE with SYNC B, and then flows to a function block 310 to transfer data from the PE to the DOR with the SYNC B clock and then back to the input of the function block 308. The program also flows from the function block 310 to a function block 312 to output data from the DOR with the SYNC B clock.

Figure 12:
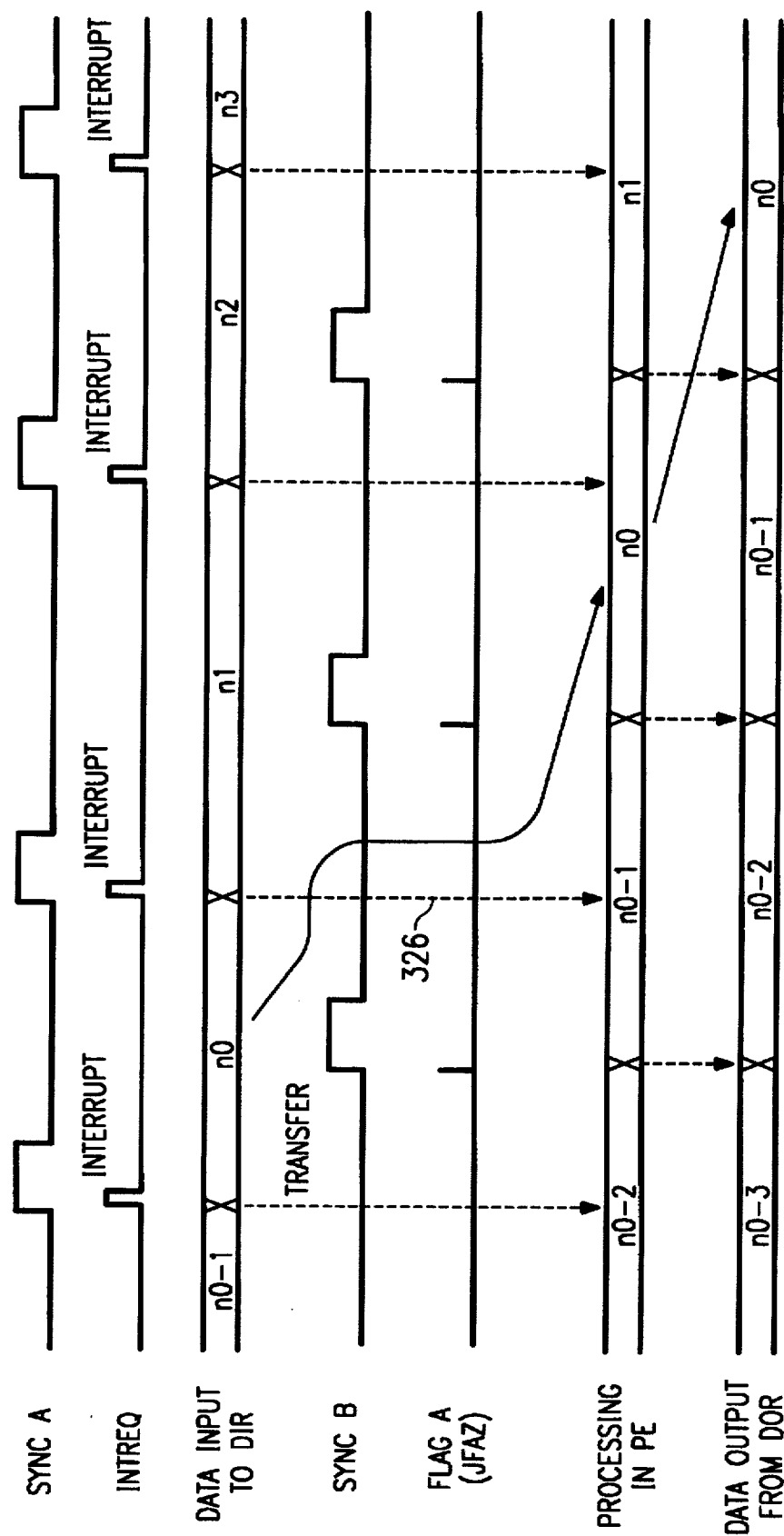
FIG. 12 illustrates the timing diagram for the flowchart of FIG. 11.

When INTREQ is generated, the program goes into an interrupt routine indicated by a dashed line 314. In the interrupt routine, the program flows along a JUMP path 316 to a function block 318 wherein the contents of the working registers are saved in the ALU. The program then flows to a function block 320 to transfer the data from the DIR to the PE. The program then flows to a function block 322 to retrieve the contents of the working registers in the ALU and then back along a return path 324. The timing diagram FIG. 11 is illustrated in FIG. 12. In FIG. 12, it can be seen that data transferred into the DIR is transferred upon the falling edge of the INTREQ signal. However, if the signal occurs out of sync with the leading edge of the SYNC B, the data will not be transferred until the leading edge of SYNC B occurs. The data transfer can be seen by a dotted line 326 for the transfer of the data input n0 which will be input to the DIR during the time the data n0−1 is being processed in the PE. Therefore, the data transfer did not actually take place until after n0−1 has been processed, but which occurs at the leading edge of the SYNC B pulse. At this time, the data is processed with the SYNC B signal, it being remembered that it was transferred to the PE at the falling edge of the INTREQ for processing by the PE with the present processing operation halted and the contents of the working registers temporarily stored and then retrieved to resume the processing operation. This allows the system to pipeline and the transfer operation to occur on an asynchronous basis relative to the end of a processing cycle in the PE.

Referring now to FIG. 13, there are illustrated the microinstructions to save and retrieve the contents of the "M", "A", "B" and "C" registers. The contents of the M working register are saved in RF0, and the contents of the C working register as saved in RF0. The value of the M register is then set equal to zero, and the value in the C register is then set equal to zero. The contents of the B working registers are then saved to the RF0 register. Thereafter, the value in the M register is set equal to one and the value in the B register is set equal to zero and then the value in the A working register is saved to the RF1 register. When the contents of the working registers are again loaded with the previous values in the working registers for continued processing thereof, the values in the working registers are sequentially transferred to the M working register, the C working register, the B working register and then the A working register.

Figure 14:
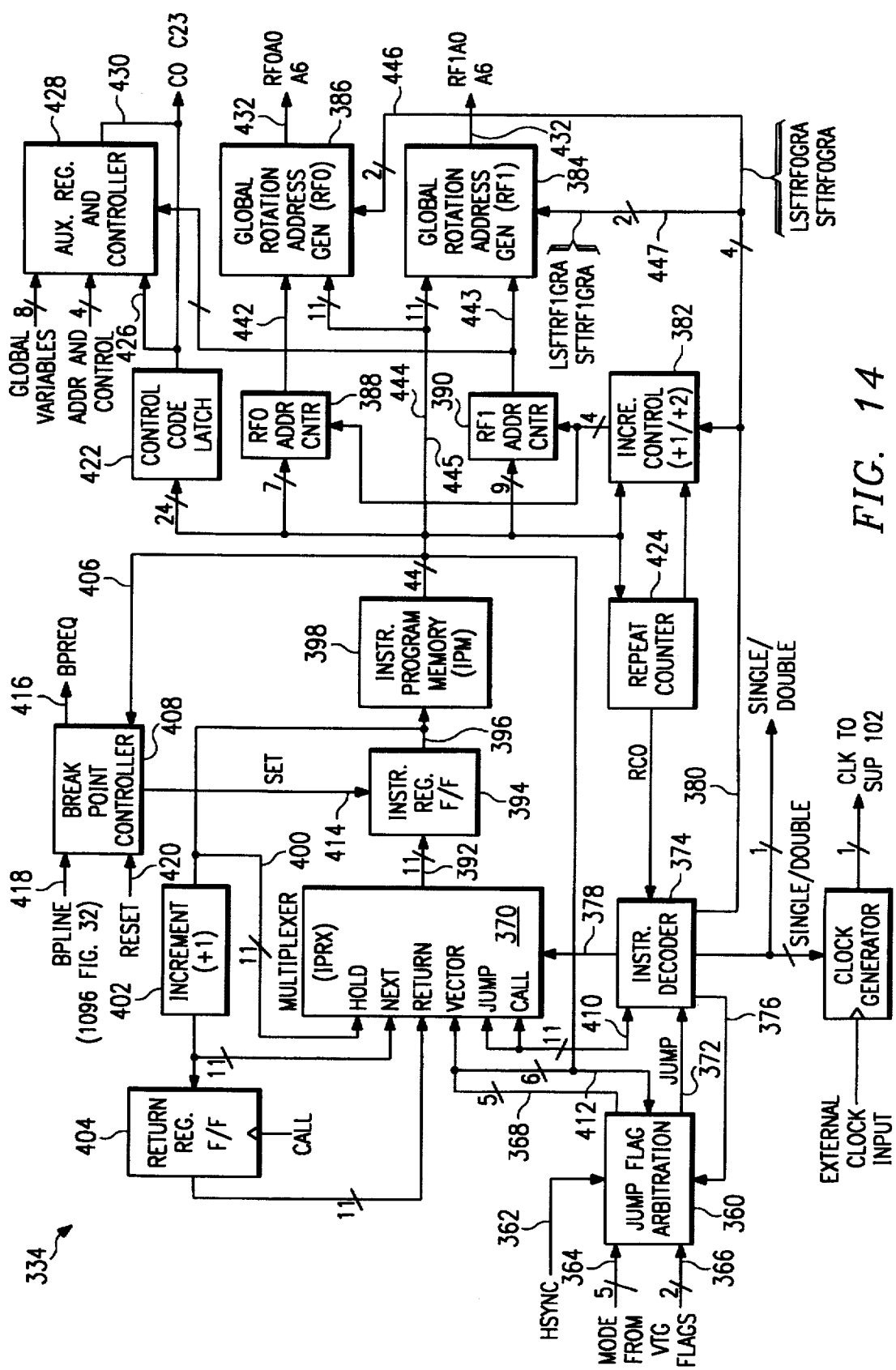
FIG. 14 illustrates the instruction generator section of the FIG. 13 controller.

Referring now to FIG. 14, there is illustrated a detailed block diagram of the Instruction Generator 334 of FIG. 13. Instruction Generator 338 includes jump flag arbitration control logic 360 which receives a horizontal synchronization signal 362, a mode control signal 364 from vertical timing generator 330, and flag signals 366. Jump flag arbitration logic 360 provides 5 of eleven vectored jump address bits to input 368 of an instruction program register multiplexer (IPRX) 370. The five bits on lines 368 are the least significant of the eleven total. Jump flag arbitration logic 360 also provides a jump signal 372 to instruction decoder 374. Instruction decoder 374 provides multiple output signals. A line 376 carries one of the output signals back to an input of jump flag arbitration logic 360. Lines 378 carry a 4-bit decoded multiplexer output control signal to IPRX 370. Lines 380 carry control signals to increment control logic 382 and to a global rotation address generator (RF1) 384 and to a global rotation address generator (RF0) 386. The 4-bit control signal provided on lines 380 instructs the global rotation address generator 384 and 386 to load or shift data for their respective register files. The signal provided to increment control logic 382 set the address counter 388 and 390 increment for +1 increment if single instruction operation is implemented and to +2 increment if double instruction operation is implemented.

IPRX 370 provides an 11-bit instruction address on lines 392 to instruction program register 394. Output signal 396 from instruction program register 394 is an address for instruction program memory 398. Address 396 is also provided back to the HOLD input 400 of IPRX 370. The hold input holds the output memory address for a readdress if desired. Address 396 is also provided to a +1 increment control logic 402. Increment logic 402 increments address 396 for return register 404, or instructs the IPRX 370 to step to the next address. The return register 404 is latched by a CALL input signal.

Instruction program memory (IPM) 398 stores the SVP system array instruction set in microcode. The array instruction set is presented earlier herein. The 44 instruction bits from instruction program memory 398 are branched to various locations as set forth in the array instruction set. For example, bit number forty-three is a break point flag. This bit is provided via line 406 to break point controller 408. Other control bits are provided to the VECTOR, JUMP and CALL inputs of IPRX 370, and to input 410 of instruction decoder 374. A mask value bit for selecting a flag is provided via line 412 to jump flag arbitration logic 360. If breakpoint controller 408 is enabled during a break point bit read, a break signal on lines 414 and 416 to stop operation to provide a test. Breakpoint controller 408 also receives a breakpoint line (BPline) input signal 418 and a reset signal input 420. Instruction bits 0 through 23 are branched from Instruction program memory (IPM) 398 to control code latch 422. Bits 25 through 31 are branched to RF0 address counter 388. Bits 32 through 38 are branched to RF1 address counter 390. Bits 39 through 42 are branched to repeat counter 424 and to increment control logic 382. Increment control counter 382 also receives inputs 380 from the instruction decoder, which also provides a 4-bit control input to global rotation address generators (RF1) 384 and (RF0) 386. The latched instruction output 426 from control code latch 422 is provided to auxiliary register and controller logic 428, which also receives global variables signal. Output 426 is also provided directly as microcode bits 0 through 23 on line 430. Outputs 432 are provided to the SVP processor device.

In operation, Instruction Generator 334 feeds the SVP processor array with a stream of data, instructions, addresses, and control signals at a desired clock rate. The generated microcode manipulates and instructs the processor element arithmetic logic units, multiplexer, registers, etc. of SVP 102 of FIG. 1. Instruction Generator 334 can, in addition to the core instructions, generate instructions which allow the SVP core processor to operate in the manner of a simple microprocessor. In this mode, instructions such as unconditional jump, call, and jump on certain flag test instructions flag 0, 1, etc., will be performed. The flags can be externally tested. Instruction Generator 334 can receive control codes from Vertical Timing Generator 330, and receive flags or requests for interrupt from Horizontal Timing Generator 332.

During operation, instruction microcode stored in instruction Program Memory (IPM) 398 are fetched, interpreted and executed by Instruction Decoder 374. Some of the decoded signals can be used as the address selection of Instruction Program Register Multiplexer (IPRX) 370 to change the address latched in the Instruction Program Register (IPR) 394. The instruction codes control the various types of Instruction Sets, for instance, conditional or unconditional jump, subroutine call or return, vector addressing with updated mode value, single or double instruction, auxiliary register control for the distribution of global variables, and the global rotation for RAM FILE(0 and 1) (Register File) addresses, etc.

When the break point signal is asserted during the debugging stage, break point controller 408 sets the content of IPR 394 with a pre-determined value to move the flow of the program into specific subroutines in order to test the data processed by the SVP operations. This break function can be controlled by the maskable input of BPLINE within a given frame and horizontal line of the video signal.

Repeat counter 424 reduces the required amount of memory locations in IPM 398 by representing a number of successive, identical instructions as a combination of this instruction code and the number of repeating count. For example, when repeat counter 424 is not zero the instruction program memory is not stepped because the same instruction is repeated only with a different address. This allows repeating of an instruction without having the instruction stored in multiple memory locations. As illustrated in the instruction set, the instruction repeat value is coded in the microcode as bits 39 through 42.

Figure 15:
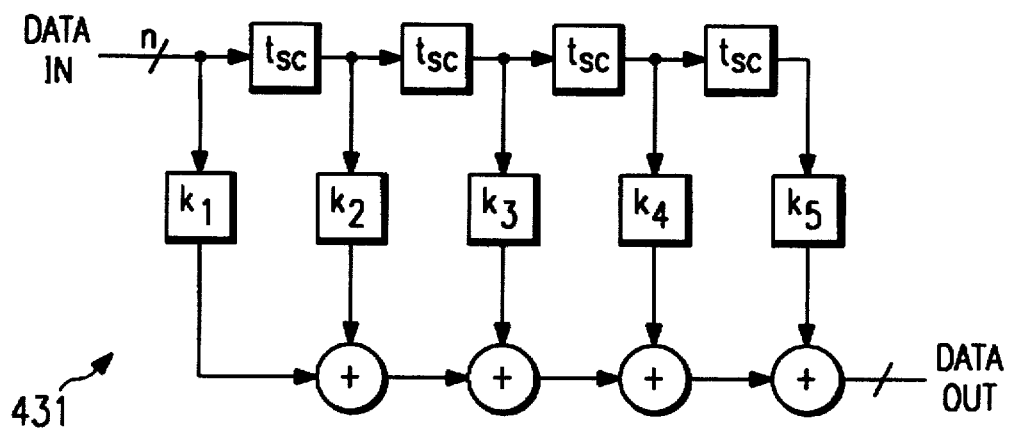
FIG. 15 illustrates a finite impulse response filter.

Referring now to FIG. 15, there is depicted a five pole finite impulse response (FIR) filter 431 of N-bit resolution which can be implemented in the present SVP device 102. By using a second nearest neighbor architecture, 2N instructions can be saved over single near-neighbor architecture. For example, it can be shown that processor 102 requires N instructions to move N bits from 2L to 1L to perform an add. Similarly, N instructions are required to move N-bits from 2R to 1R. By having second nearest-neighbor connections, 2N instructions are saved over a single near-neighbor communication network.

As the SVP is a software programmable device, a variety of filters and other functions can be implemented in addition to the FIR of FIG. 15 (horizontal filter). These include for example, vertical and temporal FIR filters and IIR filters (vertical and temporal).

Figure 16:
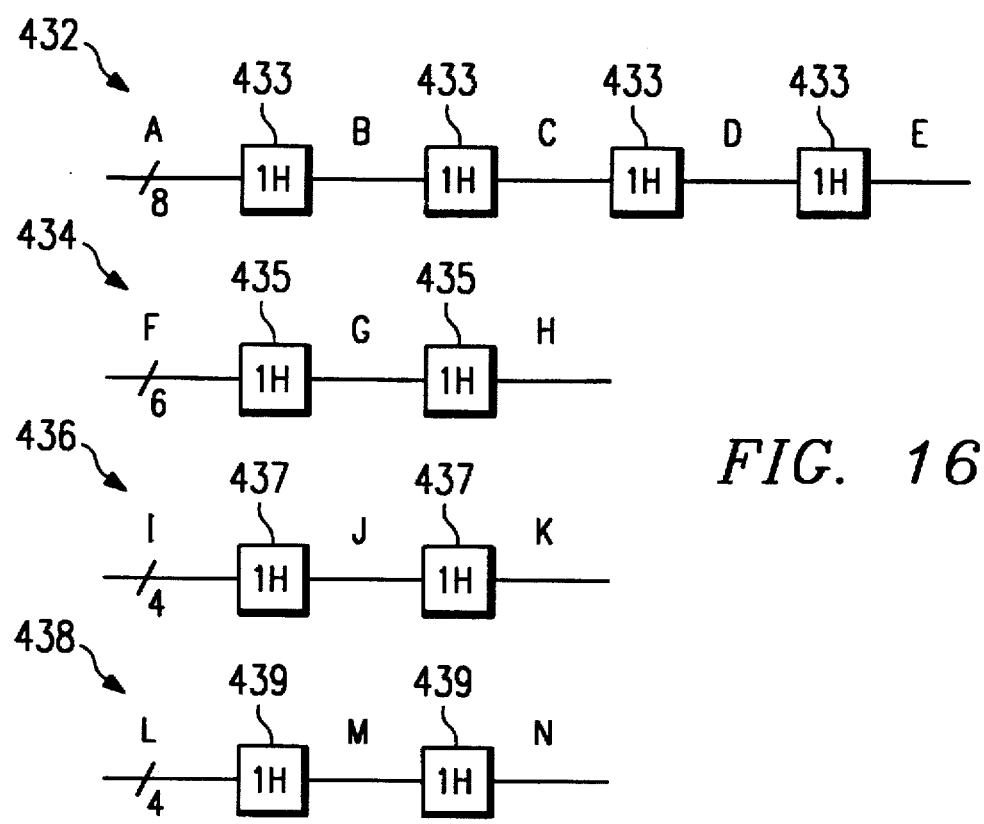
FIG. 16 illustrates an illustration of line memories.

Referring now to FIG. 16 four line memories are illustrated: an eight bit line memory 432; a six bit line memory 434; and two four bit line memories 436 and 438. These line memories can be emulated in the present SVP device 102. To illustrate the technique, assume that FIG. 17b represents a register file, such as RF0 of processor element n, having bit locations 130 through 7F (0 through 127). The FIG. 17a register file can be broken into multiple pieces. In this example the register file is broken into two pieces—lower and upper (not necessarily equal). The upper part comprises bit locations 00 through 3F. The lower bit locations 40 through 7F. If the upper part is designated the global rotation memory, the lower part can be used as the normal operating register file. For ease of understanding the global rotation part can be, for example, reorganized as "P" words of "Q" bits where P×Q is less than or equal to the total global rotation space. Each line of the FIG. 17a global rotation area comprises 8-bits of the register file transposed in a stacked horizontal fashion. When an address in this memory area is specified, it is offset by a "rotation value =Q modulus the total global rotation space. Thus instead of requiring that the data be shifted throughout the memory bank the individual line memory subset of the register file are circularly rotated. This is illustrated by the following example.

Figure 17A:
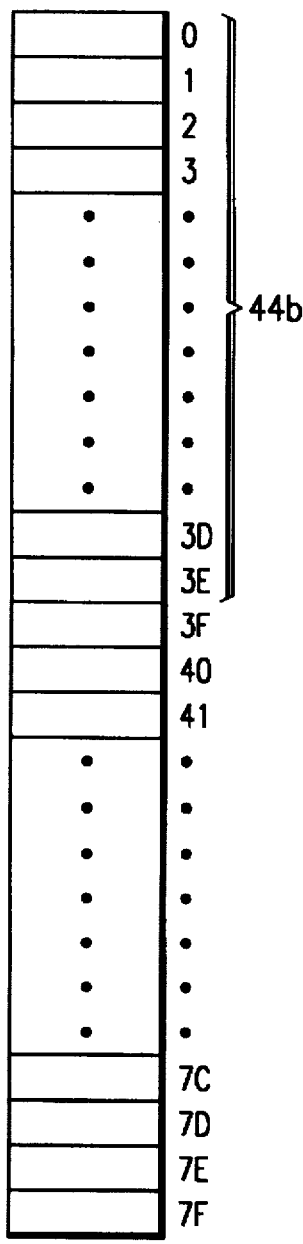
FIG. 17a illustrates a graphical depiction of a SVP register file.
Figure 17B:
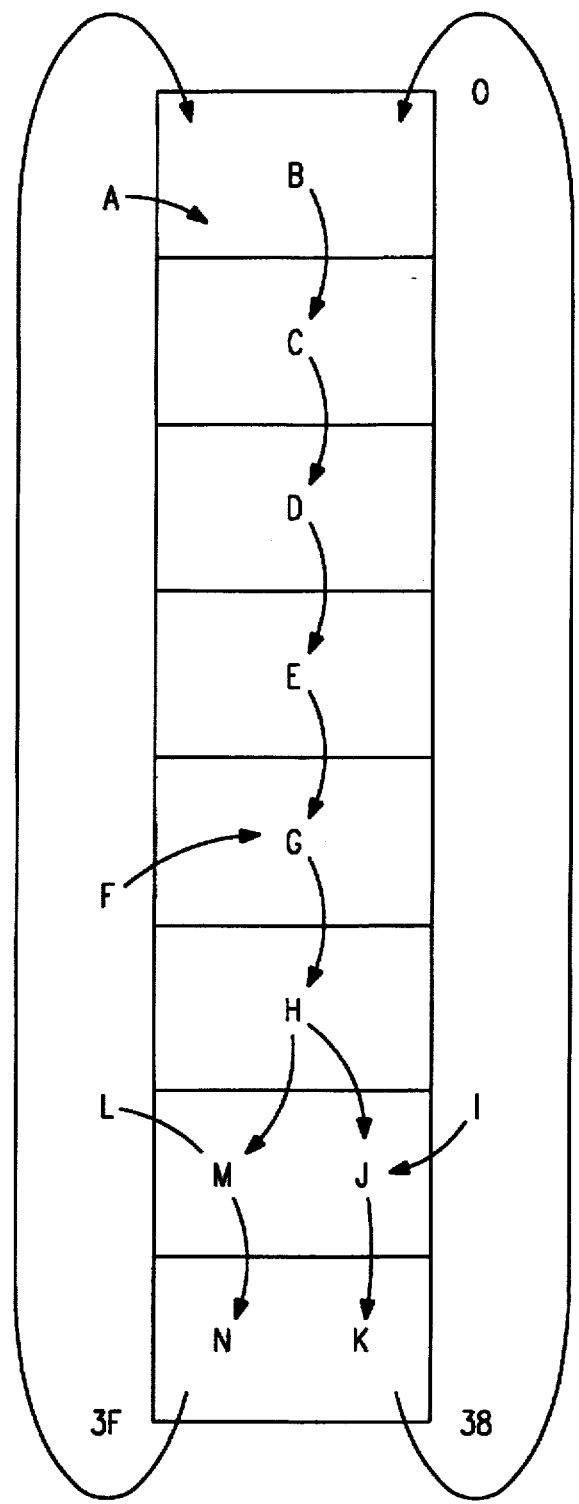

If the four example line memories of FIG. 16 are stored in the global rotation area of FIGS. 17a and 17b, and a global rotation instruction is performed, the apparent effect is for the data to follow: B→C; C→D; D→E; E→G; G→H; H→M and J; M→N; J→K; N and K→B. At first glance the movement E→G, H→M and J, and N and K→B would appear to be an error since the old data existing prior to a global rotation appears to have been merely shifted. This is not the case however since immediately after the global rotation the new data values A, F, I and L are written into those locations and thus the old values E, H, K and N are lost—as would be expected in a line memory. To emulate the 1-horizontal delays, the global rotation instruction is executed once each horizontal line time. The SVP hardware allows the setting of the value of Q and the maximum value of the global rotation space P×Q.

Figure 18:
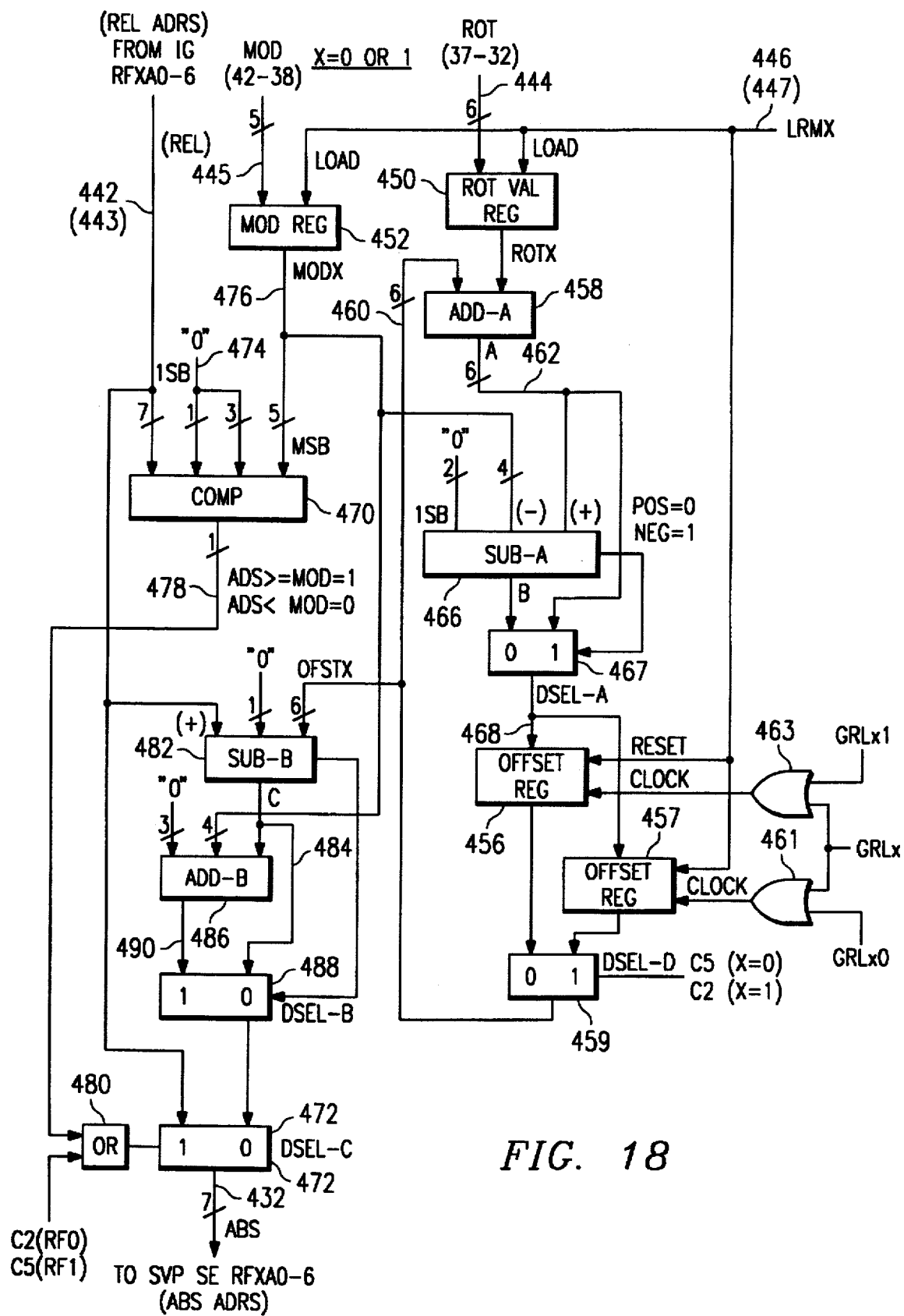
FIG. 18 illustrates a global rotation circuit.

Referring now to FIG. 18, there is illustrated a logic diagram of global rotation address generator for register file 0 (RF0) 386 and register file 1 (RF1) 384 of FIG. 14. Global rotation address generator 386 is operable to output two relative addresses or "pointers", and therefore operates as a dual pointer global rotation address generator 447. The address generator 386 receives a relative register address from register file 0 address counter via lines 442. This relative address is provided to address register locations in register file 0 via lines 432. Microcode bits 32 through 37 are six of the eleven bits provided via lines 444 and 445 from instruction program memory 398. The six bits provided via lines 444 define the amount of registers in the total register area to rotate during a rotation step. This is the word length Q in the previous example. For engineering design purposes the value defined by bits 32 through 37 are scaled by a factor of 2 in this example. The scaled Q value is provided to registers 450. Microcode bits C38 through 42, provided from instruction program memory 398 via lines 445, define the total global rotation area, or Q in the previous example. For engineering design purposes the rotation areas is scaled by a factor of 8. The scaled P×Q value is provided to registers 452. When a global rotation is to begin, instruction decoder 374 of FIG. 14 provides a signal LMRx (x=0 for RF0 and x=1 for RF1) via lines 446A for RF0. Signal LMRx is provided to modulus register (MOD REG) 452, rotational value register (ROT VAL REG) 450, offset register (OFST REG) 456 and offset register (OFST REG) 457. The function of OFST REGs 456 and 457 will be discussed further hereinafter. The LMRx signal loads the values present on lines 444 and 445 into registers 450 and 452 respectively and resets registers 456 and 457. It is only necessary to execute LRMx instruction once before using global rotation. If the global rotation size is not changed or a new global rotation is not started, there is no need to reexecute.

Adder (ADD-a) 458 adds the contents of ROT VAL REG 450 to the current contents of OFST REG 456 or 457. The output of the OFST REGs 456 and 457 are input to respective inputs of a data selector-d (DSEL-d) 459 to select one or the other. The DSEL-d 459 operates under the control of the C2 or C5 control bits, with C5=0 selecting the OFST REG 456 and C5=1 selecting the OFST REG 457 in the global rotation circuit of RF0, and with C2=0 selecting the OFST REG 456 and C2=1 selecting the OFST REG 457 in the global rotation circuit for RF1. The clock input of OFST REG 456 is connected to the output of an OR gate 463 and the clock input of OFST REG 457 is connected to the output of an OR gate 461. One input of each of the OR gates 461 and 463 is connected to a signal GRLx (x=0 for RF0, and x=1 for RF1), a clock signal. The other input of OR gate 461 is connected to a signal GRLx0 (x=0 for RF0, and x=1 for RF1) and the other input of OR gate 463 is connected to a signal GRLx1 (x=0 for RF0, and x=1 for RF1). The signals GRLx0 and GRLx1 (x=0 for RF0, and x=1 for RF1) allow the two offset registers to be clocked at different timing and allow the value in the respective OFST REGs 456 or 457 to be changed, as will be described hereinbelow. The DSEL-d 459 output provided on lines 460 is one-half the difference between that register file absolute address provided on lines 432 and the register file relative address provided on lines 442. ADD-a outputs a new offset value on lines 462 to the "+" input of subtractor-a 466 and to the "1" input of data selector-a 467. Subtractor-a 466 subtracts the four most significant bits (MSBs) of the modulus value from MOD REG 452 and the six bit output from ADD-a 458. Before performing this subtraction, two zero least significant bits (LSBs) are added to the global rotation area output value from register 452. The addition of two zero LSBs multiplies the global rotation area output by 4. Subtractor 466 is optional and tests if the offset value is outside the defined global rotation area. In this example, the offset value is within the global rotation area if the subtractor output is negative (logical high). Data selector output 468 is provided to the "1" input of data selector-a 467.

Data selector 467 selects as an input the output of subtractor 466 if the selector output is positive—indicating an offset outside the global rotation area. The output from ADD-a 458 is selected if the selector output is negative—indicating an offset outside the global rotation area. The output of data selector-a 467 is a corrected offset value. The new offset value output from data selector-a 466 is latched by the selected one of the offset registers 456 and 457 when clocked by signal GRLx0 or GRLx1 (x=0 for RF0, and x=1 for RF1) from Instruction Generator. The GRLx0 and GRLx1 instructions are executed to rotate a global rotation area (i.e., advance the offset value). This usually occurs at the beginning or ending of a scanning line or before a DIR to RF0 or RF1 to DOR transfer.

Referring now to input lines 442 of FIG. 18, the seven bits defining the register file relative address is provided as one input to comparator (COMP) 470, as one input to substractor-b (SUB-b) 482 and as one input to data selector-c (DSEL-c) 472. The seven bits provided to COMP 470 are the LSB bits of an eight bit input. The MSB is a zero bit provided on line 474. The second input to COMP 470 is a 5-bit output from MOD REG 452. The five output bits provide the most significant bits of an eight bit input to COMP 470. The three LSB bits are provided as zeroes from lines 474. Comparator 470 compares the relative address 442 with the output of modulus value register 476. As mentioned output 476 is a scaled value. The addition of three zero LSBs multiplies the scaled value by eight. Comparator 470 test for global rotation. If the relative address is greater than or equal to the modulus register 452 output, the register file locations addressed is outside the defined global rotation area and a global rotation is not performed. The comparator output 478 is provided as one of two inputs to OR gate 480. The second input is microcode control bit C2 (C5 if register file 1 is being addressed). As previously discussed hereinabove if microcode bit C2 (or C5) is 1 addressing is to DIR (DOR or auxiliary registers). If C2 (C5) is 1 do not global rotate. When the relative address is outside the register file global rotation area data selector DSEL-c 472 responsive to a signal output from OR gate 480 selects the relative address input as its absolute address output 432.

Subtractor-b SUB-b 482 receives the relative address as the "+" input. The other input is the offset register 456 output or 457 output selected by the data selector-d DSEL-D 459 plus an added 0 LSB bit. Subtractor-b 482 performs a global rotation and test. Subtractor-b subtracts between the relative address value 442 and the defined offset value. The output on lines 484 is the absolute address. The absolute address value 484 is provided as one of two inputs to adder-b (ADD-b) 486 and as one of two inputs to data selector-b (DSEL-b) 488. If output 484 is negative, DSEL-b 488 selects output 490 from ADD-b as the absolute address. ADD-b corrects for the occurrence of a negative address since there are no negative addresses. ADD-b 486 adds modulus register value 476 (with three added 0 LSB bits) to subtractor-b output 484. This results in a positive absolute address output from ADD-b.

In the foregoing FIG. 18 logic diagram, ADD-a is a 6-bit adder, ADD-b is a 7-bit adder, SUB-a is a 6-bit subtractor, SUB-b is a 7-bit subtractor, DSEL-a is 6-bit data selector, DSEL-b is a 7-bit data selector, DSEL-c is a 7-bit data selector, DSEL-d is a 6-bit data selector and COMP is an 8-bit comparator. ADD-a, ADD-b, SUB-a, SUB-b, DSEL-a and DSEL-c can be reduced to a 6-bit adder, 4-bit adder, 4-bit substractor, 6-bit subtractor, 4-bit data selector and 6-bit data selector, respectively, since at least one of the two inputs of the addition or subtraction has zero least significant bits.

The value of [MOD REG] is <modulus value>/8, as follows:

<modulus value>=0, 8, 16, 24, ... 112, 120, 128

[MOD]=0, 1, 2, 3, ... 14, 15, 16.

The value of [ROT VAL REG] is <rotation value>/2, and for the above example is any number between 0 and [MOD REG]*4.

If the address the relative address from Instruction Generator (REL ADRS) is greater than or equal to contents of [MOD REG]*8, the (REL ADRS) is outputted by the DSEL-c. Otherwise, modulo address is outputted by the DSEL-c to perform global rotation.

If (REL ADRS)<[MOD REG]*8:((REL ADRS)−[OFST REG]*2) mod ([MOD REG]*8) If (REL ADRS)>=[MOD REG]*8:(REL ADRS).

Figure 19A:
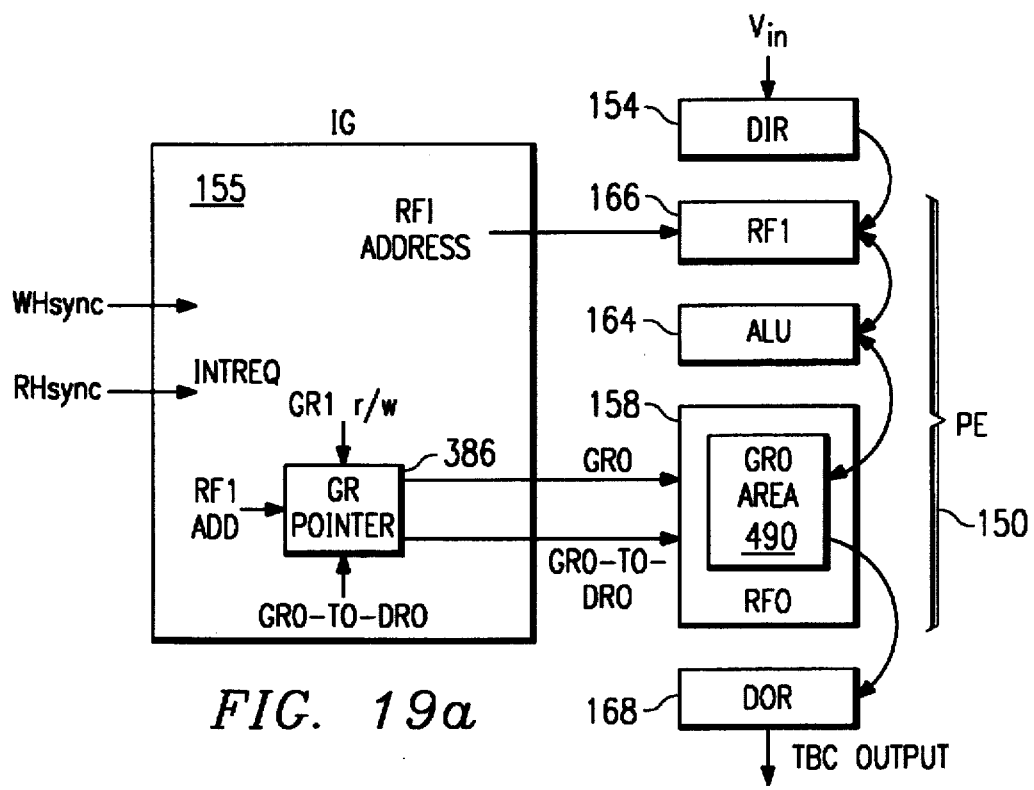
FIGS. 19a and 19b illustrate two examples of the implementation of the dual pointer global rotation address register.
Figure 19B:
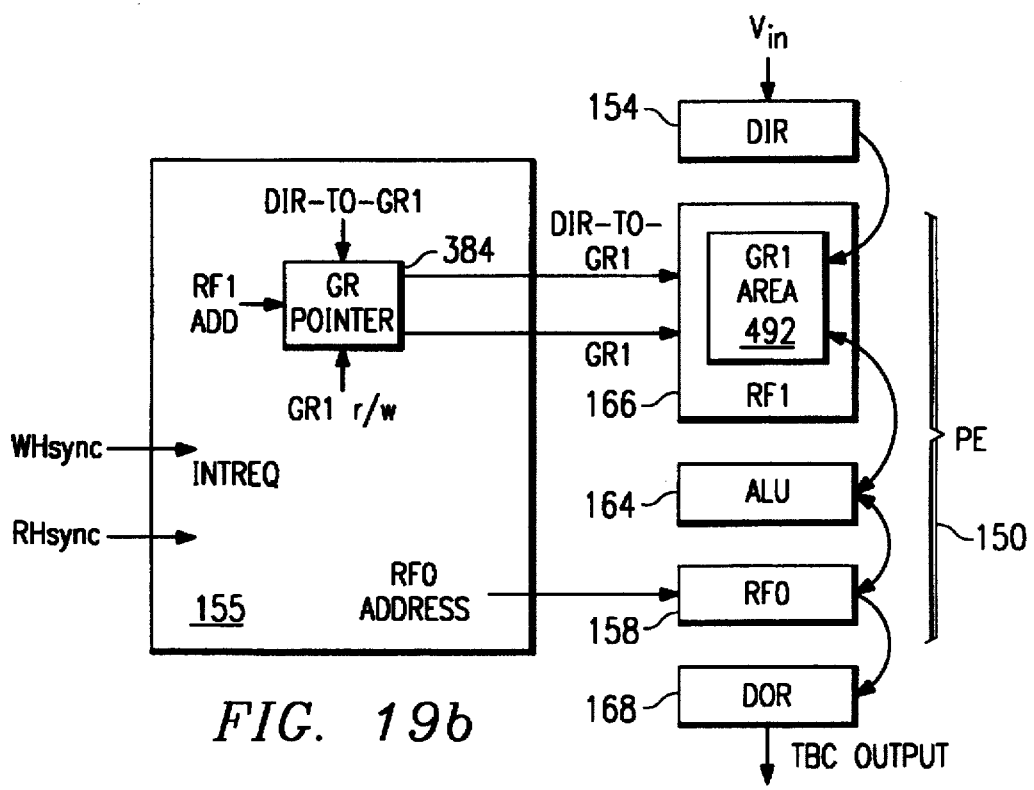

Referring now to FIGS. 19a and 19b, there are illustrated two examples of the implementation of the dual pointer global rotation address register. In the embodiment of FIG. 19a, the transfer from the DIR 154 to the RF1 166 is done in accordance with the Write clock, which is synchronized with the WHsync synchronization pulse. Therefore, the DIR-to-PE transfer is synchronous. Thereafter, the data from RF1 is operated on by the ALU 164 to perform the various processing routines. A global rotation area (GR0) 490, consisting of an eight-bit wide 6H buffer, is placed into the RF0 158. The Write/Read operation between the ALU164 and the GR0 area 490 is done within the PE 150 and is synchronous with the Write clock and, therefore, contains the jitter on the input. This is done with a GR00 pointer. However, the transfer from the GR0 area 490 to the DOR 168 by using GR01 occurs in accordance with the hardware interrupt and the RHsync signal which is not synchronized with the input Write clock. The dual-pointer global rotation circuit for RF0 158 is initially reset by the signal LRM0, and then the GR00 Read/Write pointer is advanced for 3H to be able to handle ±3H jitter. The main routine is synchronized with the WHsync sync signal that was introduced from the instruction generator 155, followed by a transfer of the data in the DIR 154 to the RF1 166, and certain signal processing done on that data. The result is stored in the GR0 area 490 by utilizing the GR00 Read/Write pointer. The GR00 pointer and the GR0-to-DOR pointer GR01 are generated by the global rotation address generator 386 which receives the RF0 relative address and outputs the RF0 absolute address.

In the operation described above, the DIR 154 is driven by a clock which is synchronized with the jittered video signal and the DOR 168 is driven by a clock which is stable. The buffered memory is implemented in the RF0 register 158.

Therefore, the DIR clock and signal processing by PE should be synchronized with the WHsync on the jittered video signal, with the average frequency of the DOR clock being at the same frequency as the DIR clock, and the same number of pixels must be written onto the DIR and read out from the DOR. Since the horizontal sync pulse on the jittered video signal (WHsync) is not synchronized with the horizontal sync pulse on the time base corrected signal (RHsync), the DIR-to-PE transfer and the PE-to-DOR transfer must be done asynchronously. This asynchronous PE-to-DOR transfer is triggered by the hardware interrupt and the asynchronous Read and Write operation for the register files is handled by the dual pointer global rotation circuit 386. This therefore allows the jittered video signal to be written and read onto a buffered memory according to Write address pointer that follows the jitter, and then read out with a Read address pointer which is stable. As long as memory is sufficient, significant jitter can be tolerated. This provides for an elastic storage type buffer.

Referring to FIG. 19b, there is illustrated an alternate embodiment wherein the 6H buffered area is placed on the RF1 166 space in the form of a GR1 area 492. In this implementation, the operation of the transfer of data from the GR1 area 492 to the ALU 164 and processing thereof is done in accordance with the RHsync sync signal. The transfer of the data from the ALU 164 to the RF0 register 168 and the transfer from the data in the RF0 register 158 to the DOR 158 is also done concurrently in accordance with the RHsync pulse. However, the transfer of data from the DIR 154 to the GR1 area 492 is done in accordance with the interrupt request INTREQ, which is the hardware interrupt. This is synchronized to the WHsync sync signal. The global rotation address generator circuit 384 is utilized to generate the GR1 pointer GR10 for transferring from/to GR1 area 492 from/to the ALU 164, and the DIR-to-GR1 pointer GR11 is utilized for transferring data from the DIR 154 to the GR1 area 492. The DIR-to-GR1 pointer is synchronous with the WHsync.

The DIR-to-GR1 pointer is the pointer GR11, the GR1 read/write pointer is the pointer GR10, the GR0 pointer is the pointer GR00 and the GR0-to-DR0 is the GR01 pointer, described above with reference to FIG. 18.

These are summarized in the following table:

TABLE 3

| GR | RF | ACCESS | ATTRIBUTE |
|---|---|---|---|
| GR11 | RF1 | DIR-to-RF1 | write |
| GR10 | RF1 | RF1-to/from-RF0 via ALU | write/read |
| GR00 | RF0 | RF0-to/from RF1 via ALU | write/read |
| GR01 | RF0 | RF0-to-DOR | read |

In the example where the global rotation with a modular value of 24 and a rotation value of 8 is created in RF1 166, the absolute address (ADRS) are rotated by GRL10 and GRL11 as follows:

TABLE 4

| TIMING | | N | N + 1 | N + 2 | N + 3 |
|---|---|---|---|---|---|
| GRL11 | | EXECUTED | EXECUTED | NOT EXEC | EXECUTED |
| GRL10 | | EXECUTED | EXECUTED | EXECUTED | EXECUTED |
| GR | | GR11/GR10 | GR11/GR10 | GR11/GR10 | GR11/GR10 |
| REL_ADRS | | | ABS_ADRS | | |
| 0 | | 0/0 | 16/16 | 16/8 | 8/0 |
| 1 | G | 1/1 | 17/17 | 17/9 | 9/1 |
| 2 | R | 2/2 | 18/18 | 18/10 | 10/2 |
| . | | . | . | . | . |
| . | | . | . | . | . |
| . | | . | . | . | . |
| 8 | A | 8/8 | 0/0 | 0/16 | 16/8 |
| 9 | R | 9/9 | 1/1 | 1/17 | 17/9 |
| . | E | . | . | . | . |
| . | | . | . | . | . |
| . | | . | . | . | . |
| 15 | A | 15/15 | 7/7 | 7/23 | 23/15 |
| 16 | | 16/16 | 8/8 | 8/0 | 0/16 |
| . | | . | . | . | . |
| . | | . | . | . | . |
| . | | . | . | . | . |
| 23 | | 23/23 | 15/15 | 15/7 | 7/23 |
| 24 | | 24/24 | 24/24 | 24/24 | 24/24 |
| 25 | | 25/25 | 25/25 | 25/25 | 25/25 |
| . | | . | . | . | . |
| . | | . | . | . | . |
| . | | . | . | . | . |
| 127 | | 127/127 | 127/127 | 127/127 | 127/127 |

The absolute address modified by GR10 is advanced relative to the absolute address modified by GR11 due to the fact that only GRL10 is executed at the timing N+2. The dual address pointer for RF1 can point to a different address as indicated by GR11 and GR10, as they are updated by GRL11 and GRL10 independently.

Figure 20A:
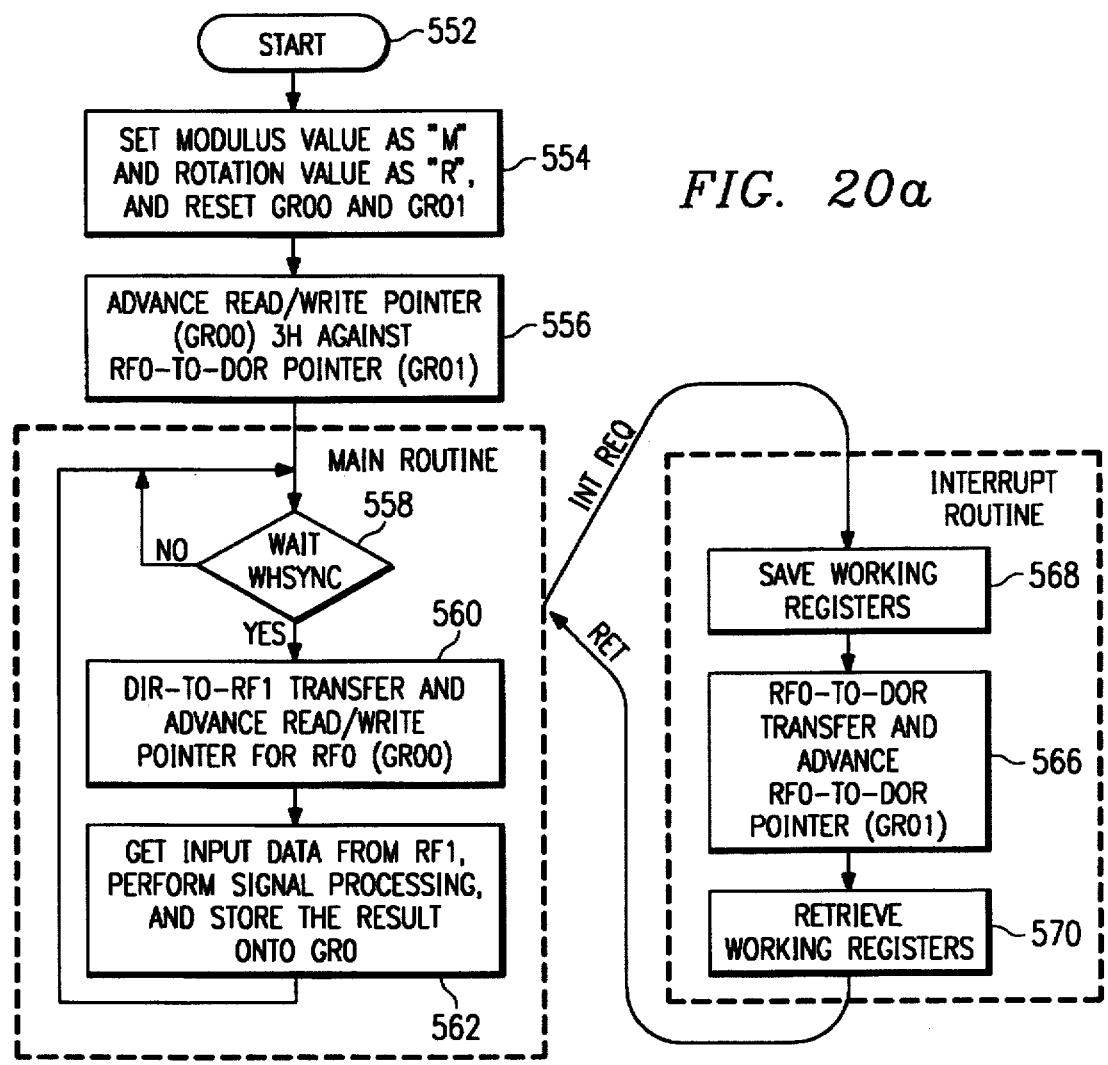
FIGS. 20a and 20b illustrate flowcharts depicting the operation of the embodiments of FIGS. 19a and 19b.

Referring now to FIG. 20a, there is illustrated a flowchart depicting the operation of the embodiment of the FIG. 19a. The process is started at a start block 552 and proceeds to a function block 554 wherein the LRM0 signal defines the modulus and rotation values for the global rotation area in RF0 (GR0) as "M" and "R", and resets GR00 and GR01. The program then flows to a function block 556 to advance the Read/Write pointer (GR00) 3H against the RF0-to-DOR pointer (GR01) by executing the GRL01 instruction three times. This basically gives a 6H TBC using the dual-pointer global rotation register with the hardware interrupt. This substantially performs ±3H TBC, which requires a 6H data buffer for maximum±jitter. Therefore, by initially advancing the Read/Write address pointer 3H against the RF0-to-DOR pointer, this provides the ±3H buffer.

After the Read/Write pointer has been advanced against the RF0-to-DOR pointer, the program flows to the main routine. In the main routine, the program flows to a decision block 558 wherein the program waits for the write horizontal sync (WHsync). When received, the program flows to a function block 560 to transfer the input data in DIR 154 to the RF1 register 166 in the PE 150, and the Read/Write pointer for RF0 (GR00) is advanced 1H for the next H signal processing. Then, the program flows to a function block 562 to get the input data from the RF1, perform a signal processing, and the result is stored onto the global rotation area in RF0 (GR0) by using the Read/Write pointer (GR00). Finally, the program flows back to the beginning of the main routine.

During the main routine, the program will flow to an interrupt routine by the interrupt request signal (INTREQ). It should be understood that the interrupt routine can start anywhere in the main routine, since this is a hardware interrupt. In the interrupt routine, the program flows to a function block 568 to save the contents of the four working registers. Next, the program flows to a function block 566 to transfer the result in the global rotation area in RF0 pointer (GR01) is advanced 1H for next H output. Finally, the program flows to a function block 570 to retrieve the contents of the working registers. After the interrupt routine is completed, the main routine is resumed by the return instruction (RET). This, therefore, allows a ±3H data buffer with asynchronous operations such as a ±3H TBC is realized.

Figure 20B:
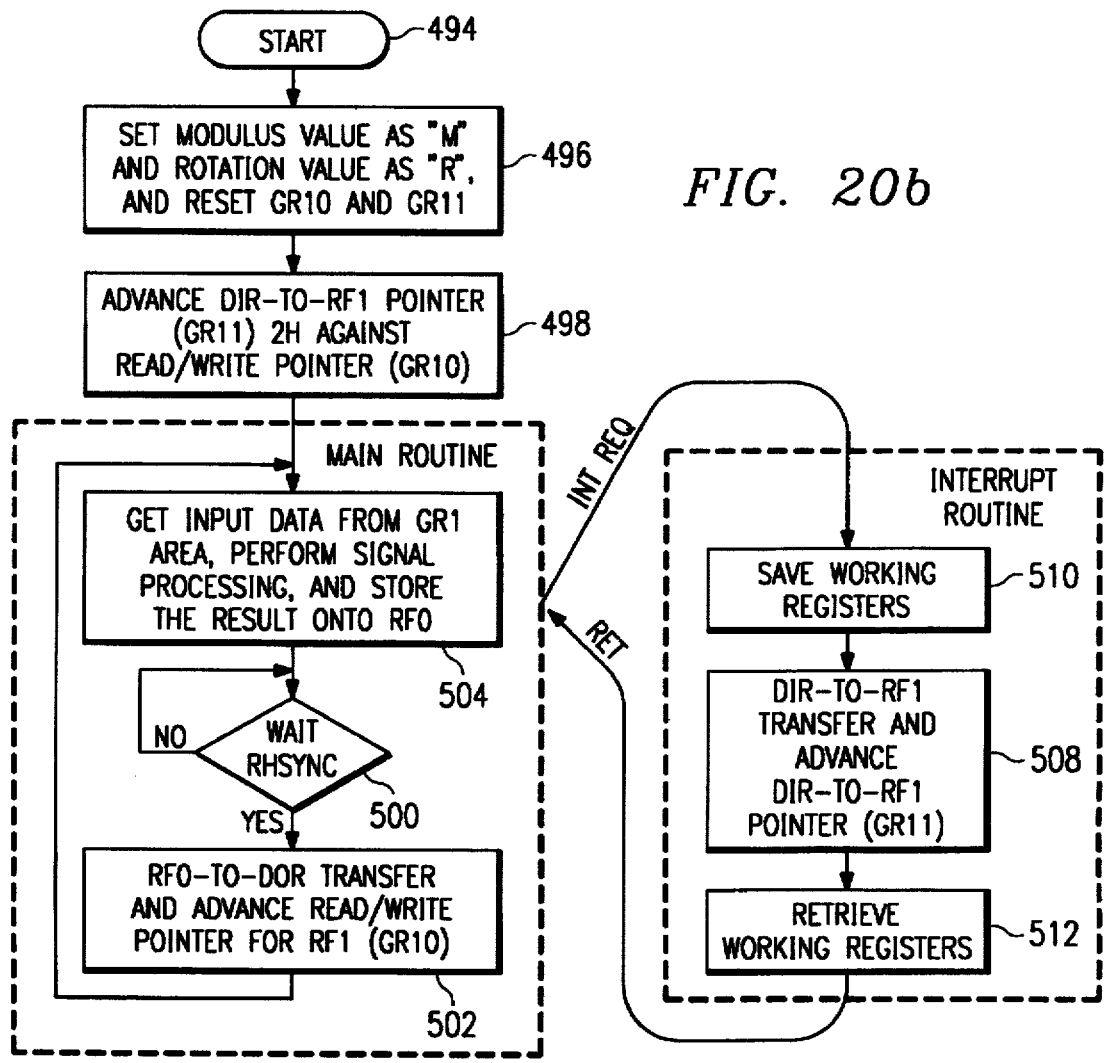

Referring now to FIG. 20b, there is illustrated a flowchart depicting the operation of the embodiment of FIG. 19b. The process is started at a start block 494 and then proceeds to a function block 496 wherein the LRM1 signal defines the modulus and rotation values for the global rotation area in RF1 (GR1) as "M" and "R", and resets GR00 and GR11. The program then flows to a function block 498 to advance the DIR-to-RF1 pointer (GR11) 2H against the Read/Write pointer (GR10) by executing the GRL11 instruction twice. This basically gives a 4H TBC using the dual-pointer global rotation register with the hardware interrupt. This substantially performs ±2H TBC, which requires a 4H data buffer for maximum±jitter. Therefore, by initially advancing the DIR-to-RF1 pointer ±2H against the Read address pointer, this provides the 2H buffer.

After the DIR-to-RF1 pointer has been advanced against the Read/Write pointer, the program flows to the main routine. In the main routine, the program flows to a function block 504 to get the input data from the global rotation area in RF1 (GR1) by using the Read/Write Pointer (GR10), perform a signal processing, and the result is stored onto RF0. Then the program flows to a decision block 500 wherein the program waits for the Read horizontal sync (RHsync). When received, the program flows to a function block 502 to transfer the result from RF0 register 158 in the PE 150 to the DOR 168, and the Read/Write pointer for RF1 (GR10) is advanced 1H for the next H signal processing. Finally, the program flows back to the beginning of the main routine.

During the main routine, the program will flow to an interrupt routine by the interrupt signal (INTREQ). It should be understood that the interrupt routine can start anywhere in the main routine, since this is a hardware interrupt. In the interrupt routine, the program flows to a function block 510 to save the contents of the four working registers. Next, the program flows to a function block 508 to transfer the input data in the DIR to the global rotation area in RF1 (GR1) by using the DIR-to-RF1 pointer (GR11), then the DIR-to-RF1 pointer (GR11) is advanced 1H for next H input. Finally, the program flows to a function block 512 to retrieve the contents of the working registers. After the interrupt routine is completed, the main routine is resumed by the return instruction (RET). This, therefore, allows a ±2H data buffer with asynchronous operations such that a ±2H TBC is realized.

In summary, there has been provided an SVP with a TBC operation. In this operation, the operation of reading data into the data input register and the operation of reading data from the data output register are performed by two different clocks. The clock operating the data input register has a fast response time to follow the jitter, whereas the clock that reads out the data from the data output register is a stable clock. In order to asynchronously transfer from the DIR to the processing element and then from the processing element to the DOR, some type of hardware interrupt and TBC buffer must be utilized. In order to realize this buffer, two address pointers are required which are rotated differently to provide an elastic endless buffer. The two pointers are asynchronous such that they can be stored on the input to the buffer on one transfer operation and read from the buffer in another operation at a different address which is rotated from the first address and this transfer operation is asynchronous with the first transfer operation. This allows the first transfer operation to follow the jitter.

Although the preferred embodiment has been described in detail, it should be understood that various changes, substitutions and alterations can be made therein without departing from the spirit and scope of the invention as defined by the appended claims.

What is claimed is:

1. A processing system for receiving input data, processing the received input data and outputting processed data, comprising:

a data input register for receiving and storing the input data, said input register having a serial input port and a first parallel data port, such that the data is received via said serial input port in a serial manner in response to a write clock and stored so as to be accessible via said first parallel port in a parallel manner in response to a processor clock;

a processor for processing data in accordance with a predetermined processing algorithm to form processed data, said processor being connected to said first parallel port so that input data can be transferred from said data input register to said processor using said processor clock for processing thereof by said predetermined processing algorithm;

a data output register connected to said processor for receiving and storing said processed data from said processor using said processor clock, said output register having a second parallel data port and a serial output port, such that processed data can be transferred from said processor to said output register via said parallel port in a parallel manner and stored so as to be accessible for output via said serial output port in a serial manner in response to a read clock;

a first sync circuit for synchronizing the operation of said data input register to the operation of an external device connected to said input register by forming said write clock, said first sync circuit being responsive to and synchronized with said input data;

a second sync circuit for synchronizing the operation of said data output register with the operation of an external device connected to said output register by forming said read clock, said second sync circuit being separate and independent of said first sync circuit, said processor clock operating asynchronously from at least one of said read clock and said write clock; and an interrupt circuit being responsive to said first sync circuit and said second sync circuit for interrupting the processing operation of said processor, thereby initiating an interruptive transfer of data between said processor and at least one of said input and output registers.

2. The processing system of claim 1, wherein said interrupt circuit is responsive to only one of said first and second sync circuits for interrupting the processing operation of said processor to initiate the transfer of data between said processor and only one of said input and output registers, and said processor being synchronized to the one of said first and second sync circuits associated with the other of said input and output registers.

3. The processing system of claim 1, wherein:

said first sync circuit is operable to track jitter in the input data; and said second sync circuit is referenced to an external clock reference that is more stable than the operation of said first sync circuit.

4. The processing system of claim 3, further comprising an elastic buffer connected to either said first parallel port of said input register or to said second parallel port of said output register so that data can be exchanged among said input or output register, as the case may be, said processor, and said elastic buffer; and said elastic buffer having associated first and second pointers, said first pointer operational to specify a location in said elastic buffer for transfer of said data between said elastic buffer and said processor, said second pointer operational to specify a location in said elastic buffer for transfer of said data between said input or output register and said elastic buffer.

5. The processing system of claim 1, wherein said processor comprises:

a first register file connected to said first parallel port of said input register for receiving and storing data from said data input register;

a second register file connected to said parallel port of said output register for receiving and storing said processed data from said processor for transfer to said data output register;

an arithmetic logic unit for processing data in accordance with said predetermined processing algorithm to generate said processed data, said arithmetic logic unit connected to said first and second register files, said arithmetic logic unit interfacing with said first and second register files during said processing operation;

working registers for utilization by said arithmetic logic unit during processing thereof to store processing parameters and intermediate processing data therein during said processing operation; and wherein the contents of said working registers are saved in response to an interrupt from said interrupt circuit until said interruptive transfer is completed.

6. The processing system of claim 5, wherein:

said first sync circuit is operable to track jitter on the input data;

said second sync circuit is referenced to an external clock reference that is relatively stable compared to the operation of said first sync circuit; and further comprising:

an elastic buffer associated with one of said first and second register files, so that data can be exchanged among said input or output register, as the case may be, said processor, and said elastic buffer; and said elastic buffer having associated first and second pointers, said first pointer operational to specify a location in said elastic buffer for transfer of said data between said elastic buffer and said processor, said second pointer operational to specify a location in said elastic buffer for transfer of said data between said input or output register and said elastic buffer.

7. The processing system of claim 6, wherein said interrupt circuit is responsive to only one of said first and second sync circuits for interrupting the processing operation of said processor to initiate the transfer of data between said processor and only one of said input and output registers, and said processor being synchronized to the one of said first and second sync circuits associated with the other of said input and output registers.

8. A processing system for receiving input data words, processing a plurality of the received data words in parallel and outputting processed data, comprising:

a data input register for receiving and storing the input data words, said input register having a serial input port and a first parallel data port, such that the data words are received via said serial input port in a serial manner in response to a write clock and stored so as to be accessible via said first parallel port in a parallel manner in response to a processor clock;

a plurality of processing elements, each for processing one of said data words in accordance with a predetermined processing algorithm to form processed data, said plurality of processing elements being connected to said first parallel port so that a different one of said input data words can be transferred from said data input register to each one of said plurality of processing elements using said processor clock for processing thereof by said predetermined processing algorithm;

a data output register connected to each of said processing elements for receiving and storing said processed data from each of said processing elements using said processor clock, said output register having a second parallel data port and a serial output port, such that processed data can be transferred from said processing elements to said output register via said parallel port in a parallel manner and stored so as to be accessible for output via said serial output port in a serial manner in response to a read clock;

a first sync circuit for synchronizing the operation of said data input register to the operation of an external device connected to said input register by forming said write clock, said first sync circuit being responsive to and synchronized with said input data;

a second sync circuit for synchronizing the operation of said data output register with the operation of an external device connected to said output register by forming said read clock, said second sync circuit being separate and independent of said first sync circuit, said processor clock operating asynchronously from at least one of said read clock and said write clock; and an interrupt circuit being responsive to said first sync circuit and said second sync circuit for interrupting the processing operation of said processing element, thereby initiating an interruptive transfer of data between said processing element and at least one of said input and output registers.

9. The processing system of claim 8, wherein said interrupt circuit is responsive to only one of said first and second sync circuits for interrupting the processing operation of each of said processing elements to initiate the transfer of data between said processing elements and only one of said input and output registers, and each of said processing elements being synchronized to the one of said first and second synch circuits associated with the other of said input and output registers.

10. The processing system of claim 8, wherein:

said first sync circuit is operable to track jitter in the input data; and said second sync circuit is referenced to an external clock reference that is more stable than the operation of said first sync circuit.

11. The processing system of claim 10, further comprising an elastic buffer connected to either said first parallel port of said input register or to said second parallel port of said output register so that data can be exchanged among said input or output register, as the case may be, said processor, and said elastic buffer; and said elastic buffer having associated first and second pointers, said first pointer operational to specify a location in said elastic buffer for transfer of said data between said elastic buffer and said processor, said second pointer operational to specify a location in said elastic buffer for transfer of said data between said input or output register and said elastic buffer.

12. The processing system of claim 8, wherein said processing element comprises:

a first register file connected to said first parallel port of said input register for receiving and storing data from said data input register;

a second register file connected to said parallel port of said output register for receiving and storing said processed data from said processing element for transfer to said data output register;

an arithmetic logic unit for processing data in accordance with said predetermined processing algorithm to generate said processed data, said arithmetic logic unit connected to said first and second register files, said arithmetic logic unit interfacing with said first and second register files during said processing operation;

working registers for utilization by said arithmetic logic unit during processing thereof to store processing parameters and intermediate processing data therein during said processing operation; and wherein the contents of said working registers are saved in response to an interrupt from said interrupt circuit until said interruptive transfer is completed.

13. The processing system of claim 12, wherein:

said first sync circuit is operable to track jitter on the input data;

said second sync circuit is referenced to an external clock reference that is relatively stable compared to the operation of said first sync circuit; and further comprising:

an elastic buffer associated with one of said first and second register files, so that data can be exchanged among said input or output register, as the case may be, said processor, and said elastic buffer; and said elastic buffer having associated first and second pointers, said first pointer operational to specify a location in said elastic buffer for transfer of said data between said elastic buffer and said processor, said second pointer operational to specify a location in said elastic buffer for transfer of said data between said input or output register and said elastic buffer.

14. The processing system of claim 13, wherein said interrupt circuit is responsive to only one of said first and second sync circuits for interrupting the processing operation of each of said processing elements to initiate the transfer of data between each of said processing elements and only one of said input and output registers, and each of said processing elements being synchronized to the one of said first and second sync circuits associated with the other of said input and output registers.

15. A method for processing input data, comprising the steps of:
receiving and storing input data in a data input register in a serial manner using a write clock;
providing a processor;
transferring data in parallel from the input data register to the processor for processing in a first transfer step using a processor clock;
processing the data with the processor in accordance with a predetermined processing algorithm to form processed data therefrom;
transferring the processed data output by the processor in a second transfer step to a data output register using said processor clock for storage therein;
outputting the processed data therefrom in a serial manner using a read clock;
generating a first sync signal in synchronism with an external device connected to said input register and synchronizing said write clock and the operation of the receiving stop to the first sync signal;
independently generating a second sync signal in synchronism with an external device connected to said output register and synchronizing said read clock and the operation of the outputting step to the second sync signal, the first sync signal and the second sync signal operating asynchronously, wherein said processor clock operates asynchronously from at least one of said read clock and said write clock; and
interrupting the processing operation of the processor in response to at least one of said first and second sync signals to initiate at least one of the first and second transfer steps.

16. The method of claim 15, wherein the step of interrupting is operable to interrupt the processing operation of the processor to initiate only one of the first and second transfer steps, and further comprising synchronizing the step of processing to the one of the first and second sync signals associated with the other of the first and second transfer steps.

17. The method of claim 15, wherein:
the step of generating the first sync signal comprises generating a first sync signal and said write clock that tracks jitter in the input data; and
the step of generating the second sync signal comprises generating a second sync signal and said read clock that is referenced to an external clock reference that is more stable than the first sync signal.

18. The method of claim 15, further comprising:
providing an elastic buffer; and wherein the first transfer step further includes:
transferring data into the elastic buffer from the input data register in accordance with a Write pointer that points to a predetermined location in the elastic buffer and transferring data from the elastic buffer to the processor in accordance with a Read pointer that points to another predetermined location in the elastic buffer.

19. The method of claim 15, further comprising:
providing an elastic buffer; and wherein the second transfer step further includes:
transferring data into the elastic buffer from the processor in accordance with a Write pointer that points to a predetermined location in the elastic buffer and transferring data from the elastic buffer to the data output register in accordance with a Read pointer that points to another predetermined location in the elastic buffer.

20. The method of claim 15, wherein the step of providing a processor comprises:
providing a plurality of parallel processor elements, each processor element having a first register file, a second register file, an arithmetical logic unit interfaced with the first and second register files, and a working register file;
utilizing the working register file during the operation of the arithmetic logic unit to store processing parameters and intermediate processing data therein;
disposing the processor elements between the data input register and the data output register;
the first step of transferring data in parallel from the input data register to the processor comprises transferring and storing data from the data input register to the first register file;
the step of processing comprises interfacing the arithmetic logic unit with the first register file and processing data therein in accordance with the predetermined processing algorithm to generate the processed data and operating the arithmetic logic unit in conjunction with the first and second transfer steps; and outputting the processed data and storing it in the second register file for transfer from the second register file to the data output register via the second transfer step; and
the step of interrupting the processor operation further includes saving the contents of the working register until the first or second transfer step, as the case may be, associated therewith is complete.

21. The method of claim 19, wherein:
the first sync signal is operable to track jitter on the input data;
the second sync signal is referenced to an external clock reference that is relatively stable compared to the first sync signal, and further comprising:
providing an elastic buffer and associating the elastic buffer with one of the first and second transfer steps;
transferring data into the elastic buffer associated with the first or second transfer step in accordance with a Write pointer that points to a predetermined location in the elastic buffer and outputting data in accordance with a Read pointer that points to another predetermined location in the elastic buffer;
synchronizing the operation of the Write pointer with one of the first and second sync signals; and
synchronizing the Read pointer with the other of the first and second sync signals.

* * * * *